(12) United States Patent
Mitani et al.

(10) Patent No.: US 9,494,930 B2
(45) Date of Patent: Nov. 15, 2016

(54) AUTOMATIC PROGRAMMING APPARATUS AND AUTOMATIC PROGRAMMING METHOD

(75) Inventors: Yuka Mitani, Tokyo (JP); Kenji Iriguchi, Tokyo (JP); Akira Miyata, Tokyo (JP); Tomonori Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 501 days.

(21) Appl. No.: 13/377,171

(22) PCT Filed: Jul. 6, 2010

(86) PCT No.: PCT/JP2010/004399
§ 371 (c)(1),
(2), (4) Date: Dec. 9, 2011

(87) PCT Pub. No.: WO2011/004584
PCT Pub. Date: Jan. 13, 2011

(65) Prior Publication Data
US 2012/0089246 A1    Apr. 12, 2012

(30) Foreign Application Priority Data
Jul. 6, 2009 (JP) .................. 2009-159689

(51) Int. Cl.
*G05B 19/4097* (2006.01)

(52) U.S. Cl.
CPC . *G05B 19/4097* (2013.01); *G05B 2219/35167* (2013.01)

(58) Field of Classification Search
CPC ................ G05B 19/4097; G05B 2219/35167; G06F 19/00
USPC ........................................................ 700/159
See application file for complete search history.

(56) References Cited

U.S. PATENT DOCUMENTS 6,957,123 B2    10/2005    Nakamura
7,027,889 B2 *   4/2006    Nakamura ......... G05B 19/4097
                                            700/173

(Continued)

FOREIGN PATENT DOCUMENTS

DE    10 2004 033 098 A1    3/2005
JP          62 224550       10/1987

(Continued)

OTHER PUBLICATIONS

Asakawa et al., "Automation of Chamfering by an Industrial Robot; for the Case of Hole on a Free Cured Surface", Oct. 2002, Journal of Robotics and Computer-Integrated Manufacturing, 18 (5-6): 379-385.*
Gray, WIPO Patent Application Publication No. WO2008019335 A2.*
International Search Report Issued Sep. 14, 2010 in PCT/JP10/004399 Filed Jul. 6, 2010.
U.S. Appl. No. 13/377,292, filed Dec. 9, 2011, Iriguchi et al.
Office Action mailed Mar. 11, 2016 in German Patent Application No: 11 2010 002 840.0 (with English translation).

*Primary Examiner* — Robert Fennema
*Assistant Examiner* — Jigneshkumar Patel
(74) *Attorney, Agent, or Firm* — Oblon, McClelland, Maier & Neustadt, L.L.P.

(57) ABSTRACT

To obtain an automatic programming apparatus, capable of generating a tool path for the chamfering process with a simple operation and capable of shortening the operation period and improving machining efficiency, the automatic programming apparatus includes a chamfering tool path generating unit and machining condition data. The chamfering tool path generating unit includes: a chamfered plane defining unit that generates shape data defining a chamfered plane obtained after the chamfering process is performed with respect to a shape of the chamfering target part; a reference point sequence generating unit that generates a reference point sequence used as a reference for generating the tool path data used for performing the chamfering process; and a tool reference position generating unit that, generates a reference position of a machining tool used when the machining tool passes while performing the chamfering process.

4 Claims, 18 Drawing Sheets

(56) References Cited

U.S. PATENT DOCUMENTS

| | | | |
|---|---|---|---|
| 7,184,854 B2 * | 2/2007 | Serizawa | 700/192 |
| 2005/0010327 A1 | 1/2005 | Nakamura | |
| 2006/0079988 A1 * | 4/2006 | Endo | G05B 19/4015 700/175 |
| 2008/0033592 A1 * | 2/2008 | Okrongli | G05B 19/4083 700/179 |

FOREIGN PATENT DOCUMENTS

| | | |
|---|---|---|
| JP | 2005 31904 | 2/2005 |
| JP | 2005 271148 | 10/2005 |
| JP | 2007 15084 | 1/2007 |
| WO | 2011 004585 | 1/2011 |

* cited by examiner

FIG.7
(a)
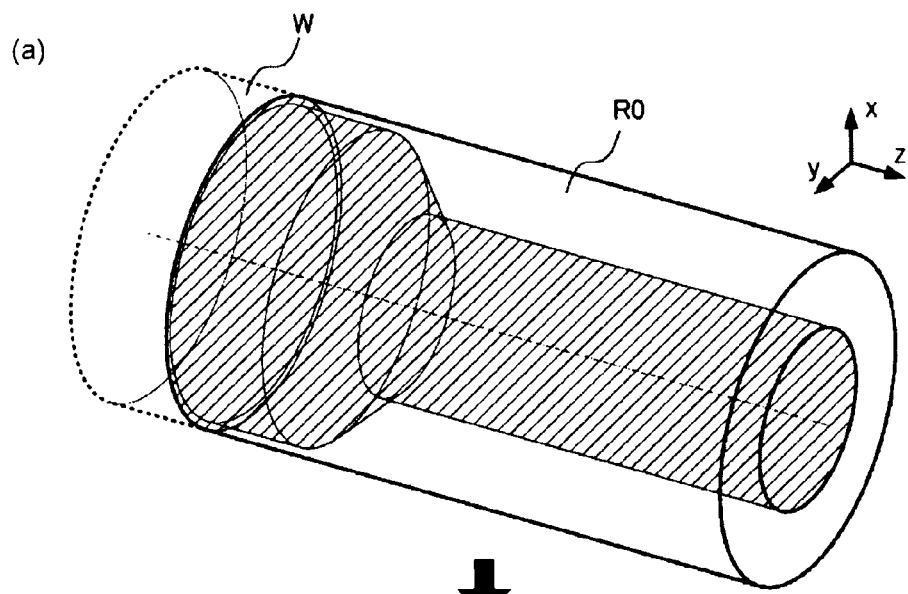
(b)
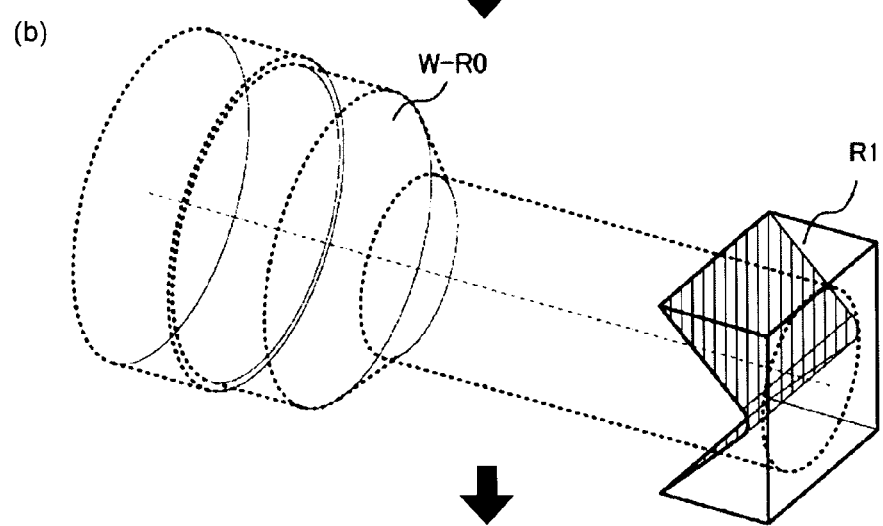
(c)
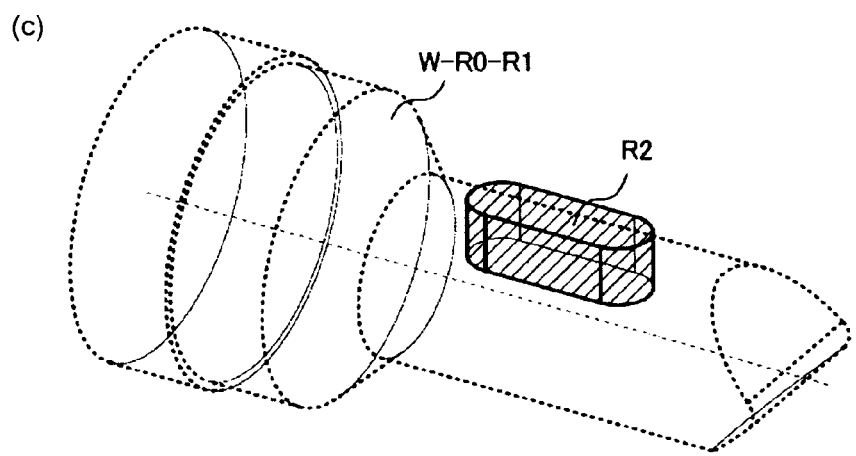

FIG.8

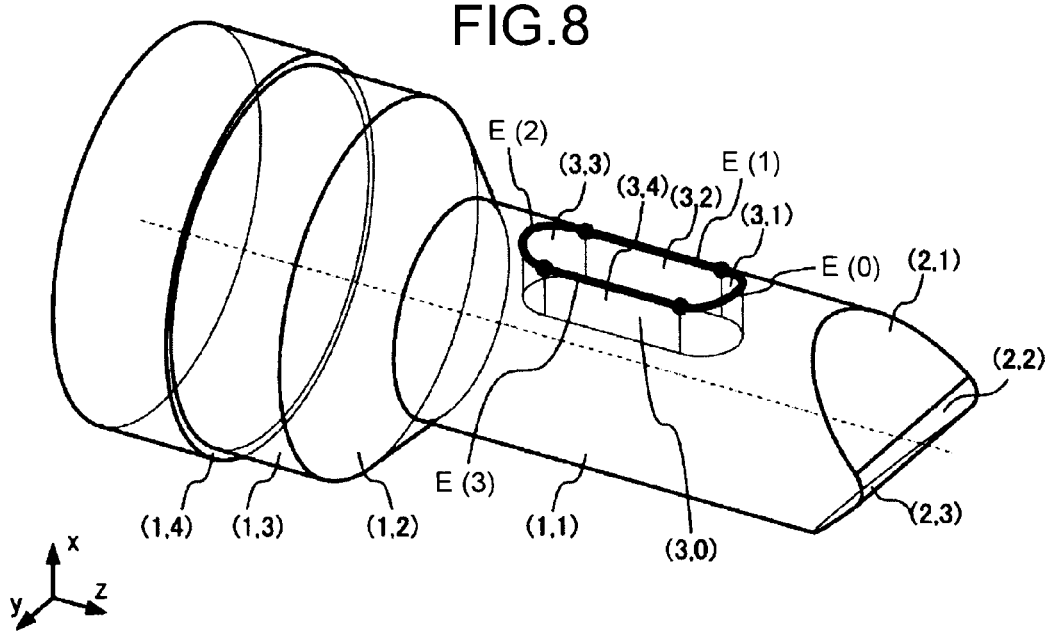

FIG.9

| MACHINING UNIT 4 |
|---|
| MACHINING REGION SHAPE:<br>  - CHAMFERING TARGET PART SHAPE<br>    REFERENCE<br>  - CHAMFERING SHAPE PATTERN<br>  - CHAMFERING PARAMETERS |
| MACHINING METHOD:<br>  CHAMFERING |
| TOOLS TO BE USED:<br>  CHAMFERING CUTTER |
| MACHINING CONDITIONS:<br>  MAIN SHAFT ROTATION NUMBER 1, FEED 1 |
| ⋮ |

FIG.10

| EDGE NUMBER | 0 | 1 | 2 | 3 |
|---|---|---|---|---|
| LEFT-SIDE MACHINING UNIT NUMBER | 1 | 1 | 1 | 1 |
| LEFT-SIDE MACHINING UNIT PLANE NUMBER | 1 | 1 | 1 | 1 |
| RIGHT-SIDE MACHINING UNIT NUMBER | 3 | 3 | 3 | 3 |
| RIGHT-SIDE MACHINING UNIT PLANE NUMBER | 1 | 2 | 3 | 4 |

FIG.14
(a)
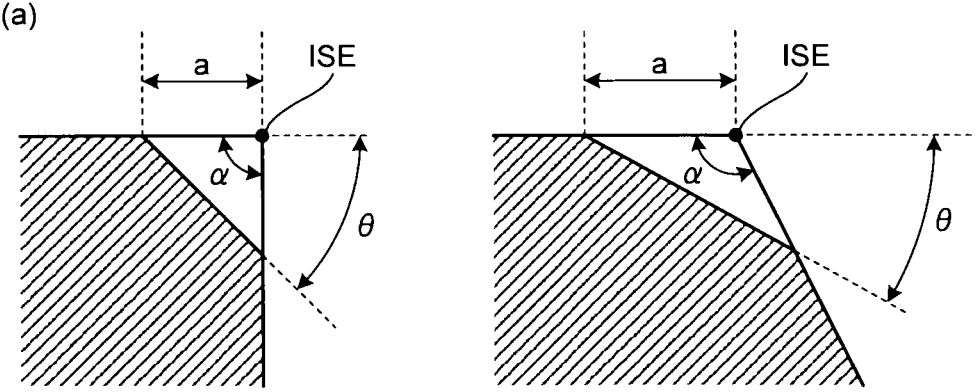
(b)
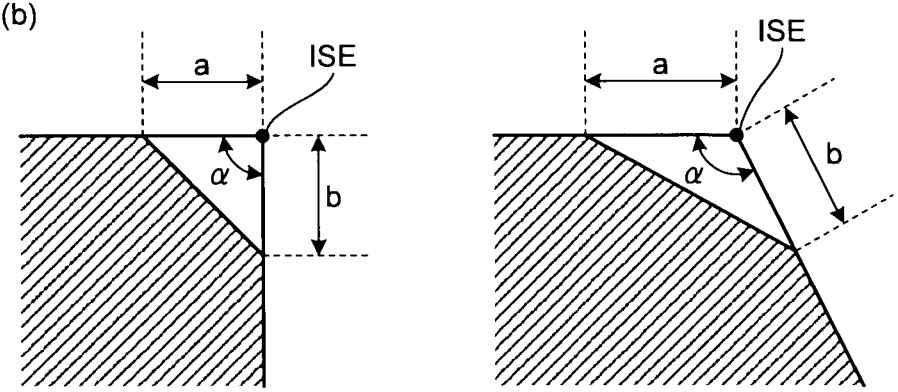
(c)
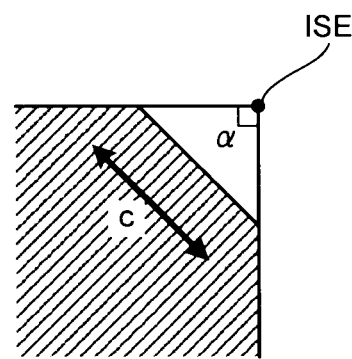

FIG. 17
(a) 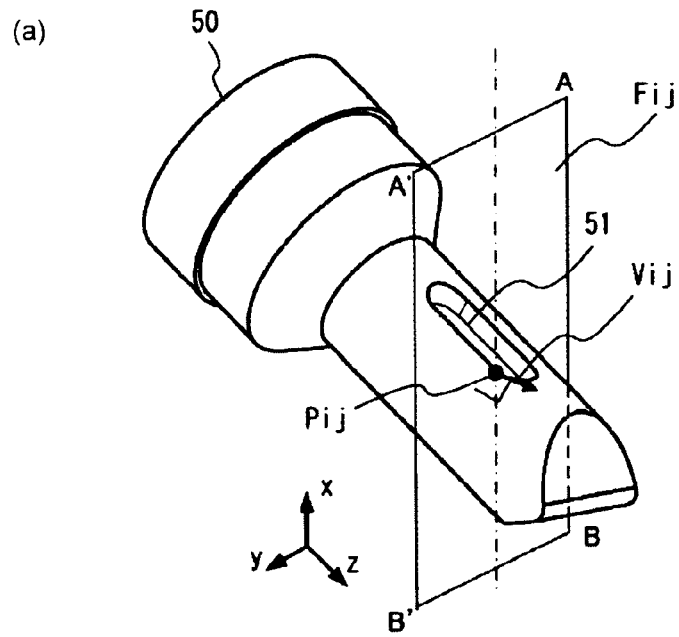
(b) 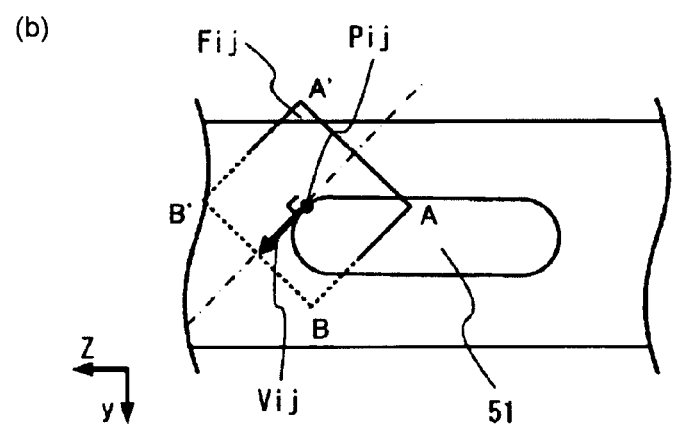
(c) 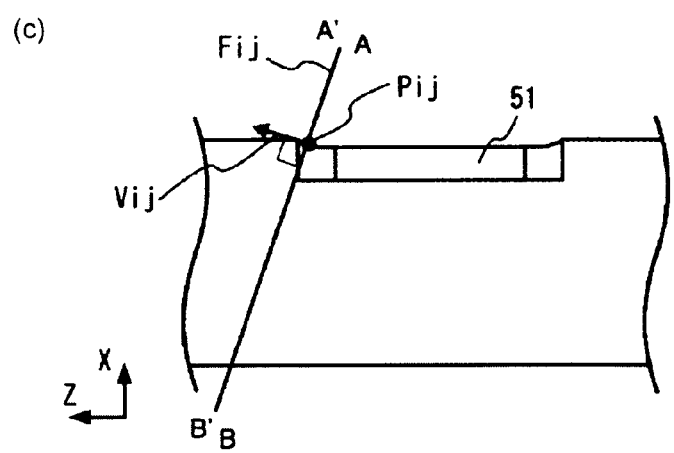

FIG.23
(a)
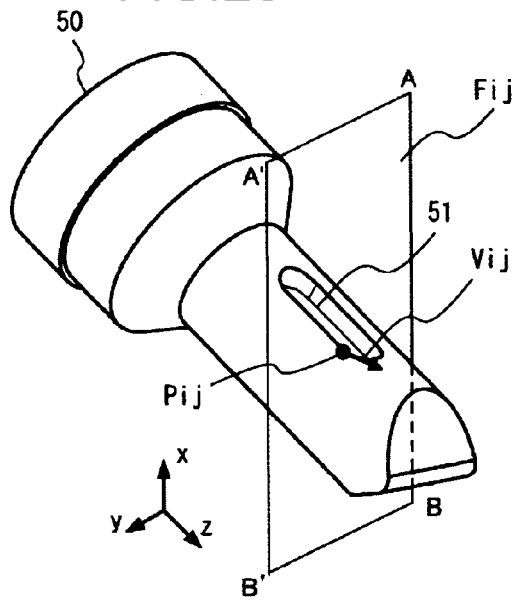
(b)
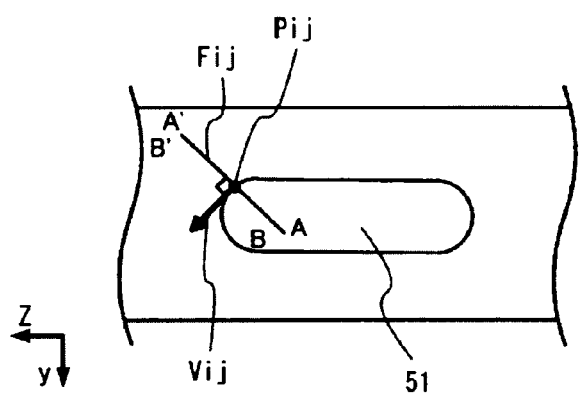
(c)
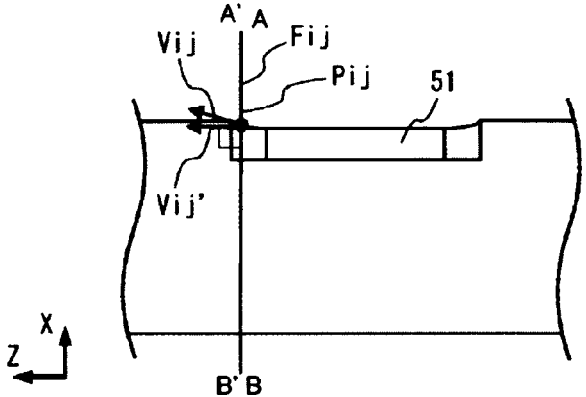

AUTOMATIC PROGRAMMING APPARATUS AND AUTOMATIC PROGRAMMING METHOD

FIELD

The present invention relates to an automatic programming apparatus and an automatic programming method that make it possible to, through a simple operation, generate tool path data used for moving a tool and performing machining when applying a chamfering process to a material shape and to select a chamfering method suitable for a chamfering target part.

BACKGROUND

When using an automatic programming apparatus configured to receive an input of machining unit data that is used for performing partial machining and includes data indicating a machining region shape, a machining method, tools to be used, and machining conditions and to generate control command information to operate a machine tool based on the input machining unit data, a chamfering process is a process to remove a corner portion of a boundary part in which planes positioned adjacent to each other intersect each other, and the shape of a chamfered part may be complicated when the target of a chamfering process is a boundary part formed by two curved planes. For this reason, the machining is normally performed manually or while employing an automatic programming apparatus, according to a Numerical Control (NC) computer program (hereinafter, "NC program") that is prepared, in advance, for performing chamfering processes (see, for example, Patent Document 1). In most situations, a chamfering process is sufficient so long as the corner portion is removed; it is therefore rare that a high level of precision is required. Further, because the method for performing a chamfering process varies depending on the part to which the chamfering process is to be applied and the material, the method for instructing the chamfering process may also vary according to the chamfering method to be used.

CITATION LIST

Patent Literature

Patent Literature 1: Japanese Patent Application Laid-open No. 2005-271148 (page 6, FIGS. 1 and 5)

SUMMARY

Technical Problem

When a conventional automatic programming apparatus is used, a chamfering process is normally performed manually or while employing the automatic programming apparatus, according to an NC program that is prepared, in advance, for performing chamfering processes. The shape of a machining part at a boundary part including a curved plane may be complicated. To perform a chamfering process suitable for such a complicated shape, it is appropriate, in many situations, to perform five-axis-controlled machining in which rotation axes are also controlled in addition to three orthogonal axes. Generally speaking, five-axis-machining NC programs are more complicated than those for three-axis machining. Thus, the amount of information required to generate a five-axis-machining NC program is also larger than that required to generate a three-axis-machining NC program. The machining performed to generate the information is also more complicated for a five-axis-machining NC program than for a three-axis-machining NC program. In many situations, a dedicated system is used for the calculations, and it is easy to obtain a calculation result with a high level of precision. However, in most situations, a chamfering process is sufficient so long as the corner portion is removed; it is therefore rare that a high level of precision is required. Consequently, a problem arises where, even if a calculation result is obtained with a high level of precision by using an expensive dedicated system, the calculation result is not utilized sufficiently, which makes the efficiency low.

To solve the problem described above, an object of the present invention is to obtain an automatic programming apparatus that is, when a chamfering process is to be performed, capable of generating a tool path for the chamfering process with a simple operation, even if a Computer Aided Design (CAD) device or an NC device having special functions is not available, and capable of shortening the operation period and improving machining efficiency.

Solution to Problem

An automatic programming apparatus according to the present invention generates control command data, based on machining unit data to apply partial machining to a material shape, including: a machining region shape generating unit that generates machining region shape data in the machining unit data; and a chamfering tool path generating unit that, while using the machining region shape data as shape data of a chamfering target part, generates tool path data used for performing a chamfering process, based on data including the shape data of the chamfering target part, used tool data, and machining condition data, and the chamfering tool path generating unit includes: a chamfered plane defining unit that generates shape data defining a chamfered plane obtained after the chamfering process is performed with respect to a shape of the chamfering target part, based on the machining region shape data and the machining condition data that are stored in advance; a reference point sequence generating unit that generates a reference point sequence used as a reference for generating the tool path data used for performing the chamfering process, based on the machining region shape data, the used tool data, and the machining condition data that are stored in advance; and a tool reference position generating unit that, with respect to each of reference points included in the reference point sequence and the chamfered plane generated by the chamfered plane defining unit, generates a reference position of a chamfering tool used when the chamfering tool passes while performing the chamfering process.

Advantageous Effects of Invention

According to an aspect of the present invention, the chamfering tool path generating unit is provided that is configured to generate the tool path data for the chamfering process based on the data including the shape data of the chamfering target part, the used tool data, and the machining condition data. Consequently, it is possible to generate the tool path for the chamfering process with the simple operation, to shorten the operation period, and to improve the machining efficiency.

BRIEF DESCRIPTION OF DRAWINGS

FIG. 7 is a perspective view of a machining region shape respectively correspond to three machining units according to the first embodiment of the present invention.

FIG. 8 is a perspective view of selected edges according to the first embodiment of the present invention.

FIG. 9 depicts machining unit data for a chamfering process according to the first embodiment of the present invention.

FIG. 10 depicts reference data for chamfering part shape according to the first embodiment of the present invention.

FIG. 14 is a drawing of an example of a pattern for chamfering processes used in commonly-used machining drawings.

FIG. 17 is a drawing for explaining a cross-sectional plane according to the first embodiment of the present invention.

FIG. 23 is a drawing for explaining a cross-sectional plane according to a second embodiment of the present invention.

DESCRIPTION OF EMBODIMENTS

First Embodiment

Figure 1:
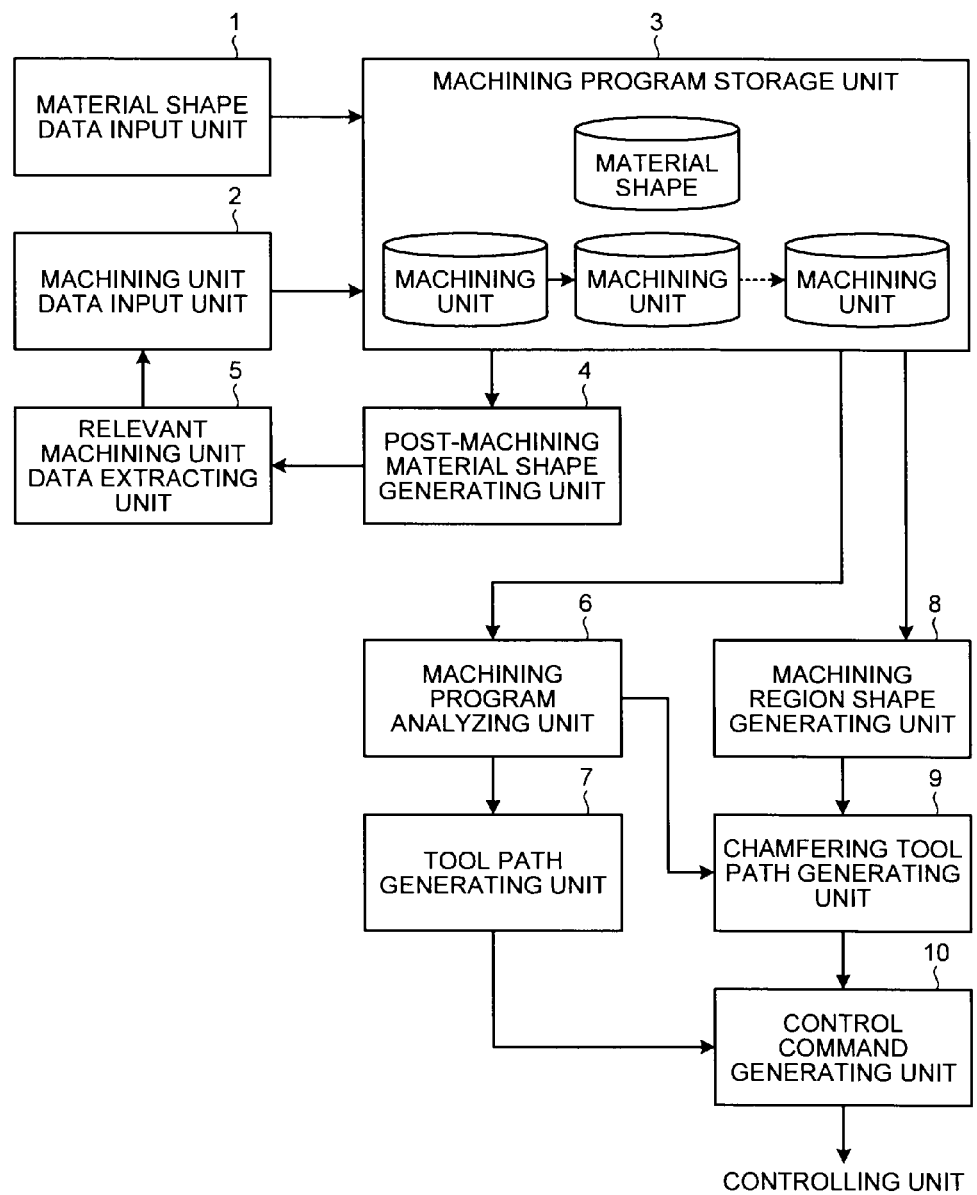
FIG. 1 is a diagram of an automatic programming apparatus according to a first embodiment of the present invention.

FIG. 1 is a configuration diagram of an automatic programming apparatus according to a first embodiment of the present invention. The automatic programming apparatus is configured to generate control command data, based on machining unit data for partial machining to apply partial machining to a material shape. The automatic programming apparatus receives an input of the machining unit data for performing the partial machining including data indicating, for example, a machining region shape, a machining method, tools to be used, and machining conditions and generates the control command data for operating a machine tool by analyzing the input machining unit data. In FIG. 1, the automatic programming apparatus is configured so as to include a material shape data input unit 1, a machining unit data input unit 2, a machining program storage unit 3, a machining region shape generating unit 8, and a control command generating unit 10.

The material shape data input unit 1 receives an external input of data defining the material shape and stores the data in the machining program storage unit 3. In an example where the material shape is a hollow circular cylinder, the data defining the material shape includes a diameter of the circular cylinder surface of the outer circumferential part, a diameter of the circular cylinder surface of the hollow part, and a length of the circular cylinder surface in the central axis direction. The machining unit data input unit 2 is configured to receive an input of other-machining-unit-reference-type data referencing machining region shape data included in the machining unit data stored in the machining program storage unit 3; and configured to output the other-machining-unit-reference-type machining unit data to the machining program storage unit 3. The machining unit data input unit 2 receives an external input of the data defining the machining unit such as the machining region shape, the machining method, the tools to be used, and the machining conditions and stores the data in the machining program storage unit 3. Examples of the other-machining-unit-reference-type machining unit data include machining unit data for a chamfering process. The machining program storage unit 3 stores therein the material shape data and a list in which pieces of machining unit data including the other-machining-unit-reference-type machining unit data are aligned according to a machining order.

Further, a post-machining material shape generating unit 4 is configured to generate post-machining material shape data, based on the material shape data and the machining unit data stored in the machining program storage unit 3. The generated post-machining material shape data is displayed and machined by a relevant machining unit data extracting unit 5. The post-machining material shape data is machining-region-removed material shape data obtained by removing a machining region shape of a machining unit that has already been defined from the material shape, based on the material shape data and the machining region shape data of the already-defined machining unit. When externally inputting the machining unit data of a chamfering process at the machining unit data input unit 2, the relevant machining unit data extracting unit 5 renders a graphic display of the post-machining material shape data generated by the post-machining material shape generating unit 4. Further, upon receiving an instruction from an operator indicating a chamfering target part, the relevant machining unit data extracting unit 5: appends, as an attribute, data for specifying a plane of the machining region shape of a corresponding machining unit to a plane of a machining region shape transferred onto the machining-region-removed material shape; extracts data for specifying, based on an edge indicated in the machining-region-removed material shape, a plane of the machining region shape of the machining unit annexed to a plane positioned adjacent to the edge; extracts reference data referenced by machining region shape data in the other-machining-unit-reference-type machining unit based on the extracted data; and forwards the reference data to the machining unit data input unit 2.

When generating a control command from the machining program, a machining program analyzing unit 6: analyzes the machining unit data stored in the machining program storage unit 3; prepares used tool data and machining condition data for generating tool path data; and forwards the data to a tool path generating unit 7 and a chamfering tool path generating unit 9. The tool path generating unit 7 generates the tool path data from the machining unit data, with respect to machining units other than the machining units for the chamfering process and forwards the tool path data to the control command generating unit 10. When generating the control command data by analyzing the machining unit data, the machining region shape generating unit 8 generates machining region shape data in the machining unit data for the partial machining i.e., the machining region shape data of the part to which the chamfering process is to be applied, based on the machining region shape data of the machining unit referenced by the other-machining-unit reference-type machining unit data and the material shape data stored in the machining program storage unit 3. Further, the machining region shape generating unit 8 sends the machining region shape data of the part to be chamfered, to the chamfering tool path generating unit 9.

The chamfering tool path generating unit 9 generates the tool path data for the chamfering process, based on the machining region shape data for the chamfering process extracted by the machining region shape generating unit 8 with respect to the machining unit for the chamfering process and based on the used tool data and the machining condition data extracted by the machining program analyzing unit 6. The chamfering tool path generating unit 9 then forwards the tool path data to the control command generating unit 10. The control command generating unit 10 is configured to generate the control command data based on the machining unit data for the partial machining including the machining region shape data. The control command generating unit 10 receives the tool path data generated by the tool path generating unit 7 and the chamfering tool path generating unit 9, generates the control command data for controlling the machine tool, and outputs the generated control command data to a controlling unit (not shown) of a control device.

Figure 2:
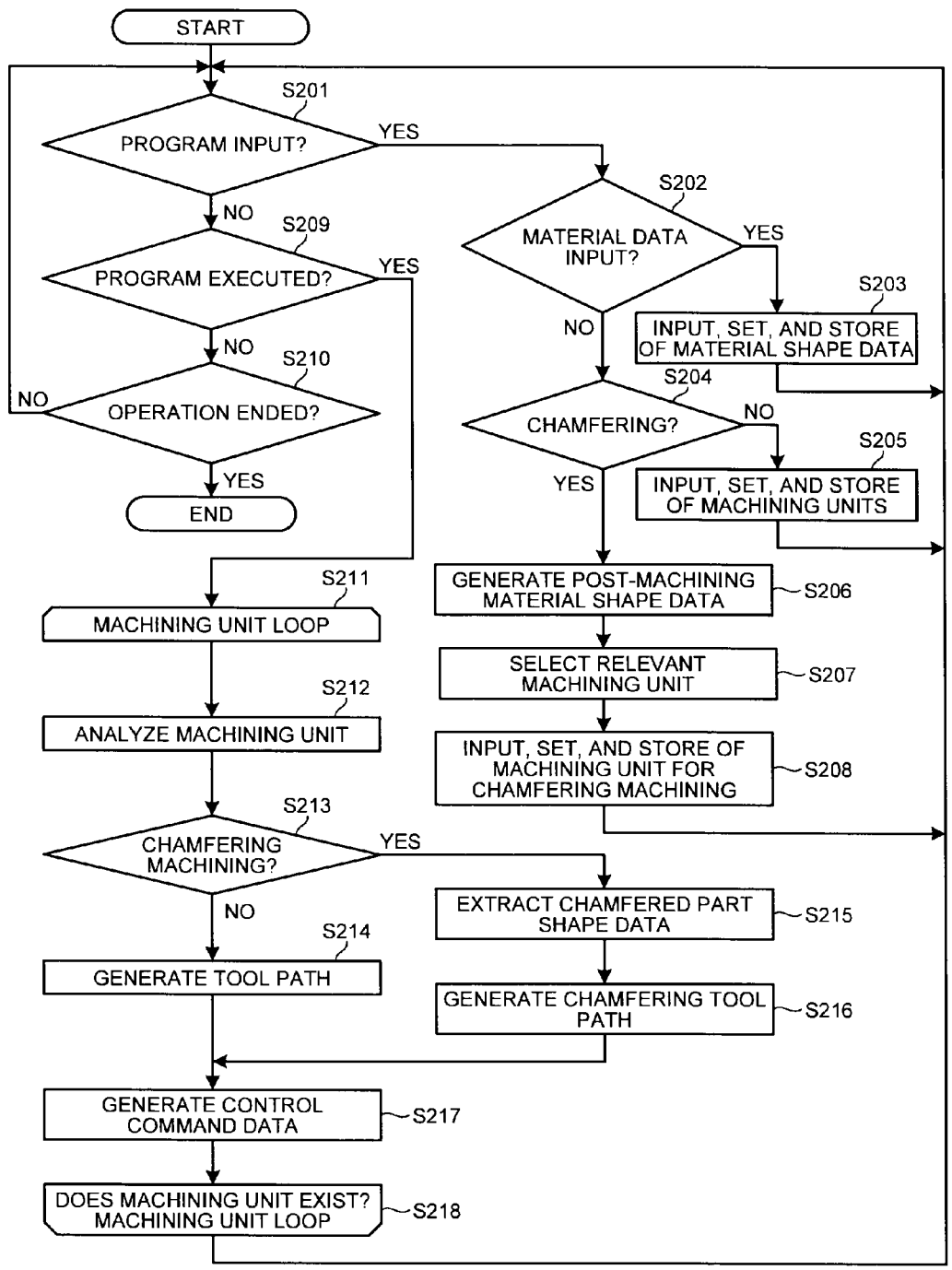
FIG. 2 is a flowchart for the automatic programming apparatus according to the first embodiment of the present invention.

Next, an operation performed by the automatic programming apparatus configured as described above will be explained. FIG. 2 is a flowchart for the automatic programming apparatus according to the first embodiment. The automatic programming apparatus operates according to the flowchart shown in FIG. 2.

At step S201, the instruction from the operator is checked to determine whether the program should be input. If the instruction indicates that the program should be input, the process proceeds to step S202. On the contrary, if the instruction does not indicate that the program should be input, the process proceeds to step S209.

At step S202, the operator instruction is checked to determine whether material shape data should be input. If the instruction indicates that material shape data should be input, the process proceeds to step S203. On the contrary, if the instruction does not indicate that material shape data should be input, the process proceeds to step S204.

At step S203, the material shape data is externally input to the material shape data input unit 1 by an instruction of an operator or the like, and the input data is stored in the machining program storage unit 3. After the process at step S203 is performed, the process returns to step S201.

At step S204, the operator instruction is checked to determine whether machining unit data for a chamfering process should be input. If the instruction indicates that machining unit data for a chamfering process should be input, the process proceeds to step S206, and if not the process proceeds to step S205.

At step S205, the machining units other than the machining units for the chamfering process is externally input at the material shape data input unit 1 in accordance with an instruction by an operator, and the input data is stored in the machining program storage unit 3.

Figure 3:
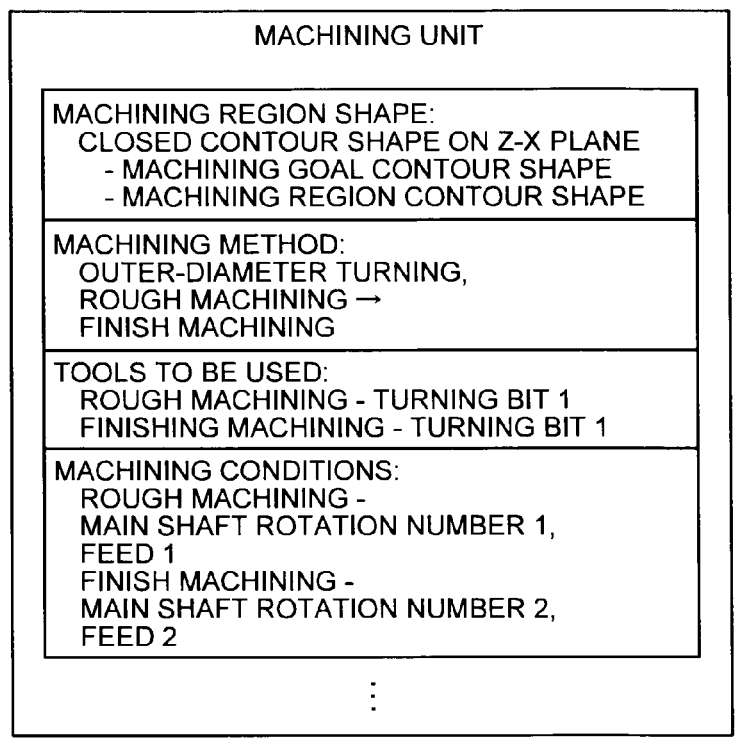
FIG. 3 depicts machining unit data for an outer-diameter turning process according to the first embodiment of the present invention.
Figure 4:
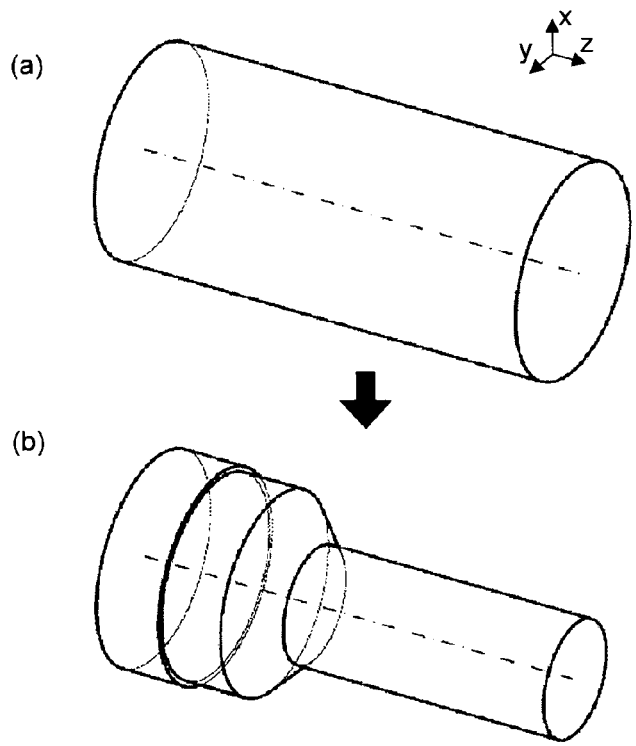
FIG. 4 is a perspective view depicting a material shape before and after the outer-diameter turning process according to the first embodiment of the present invention.
Figure 5:
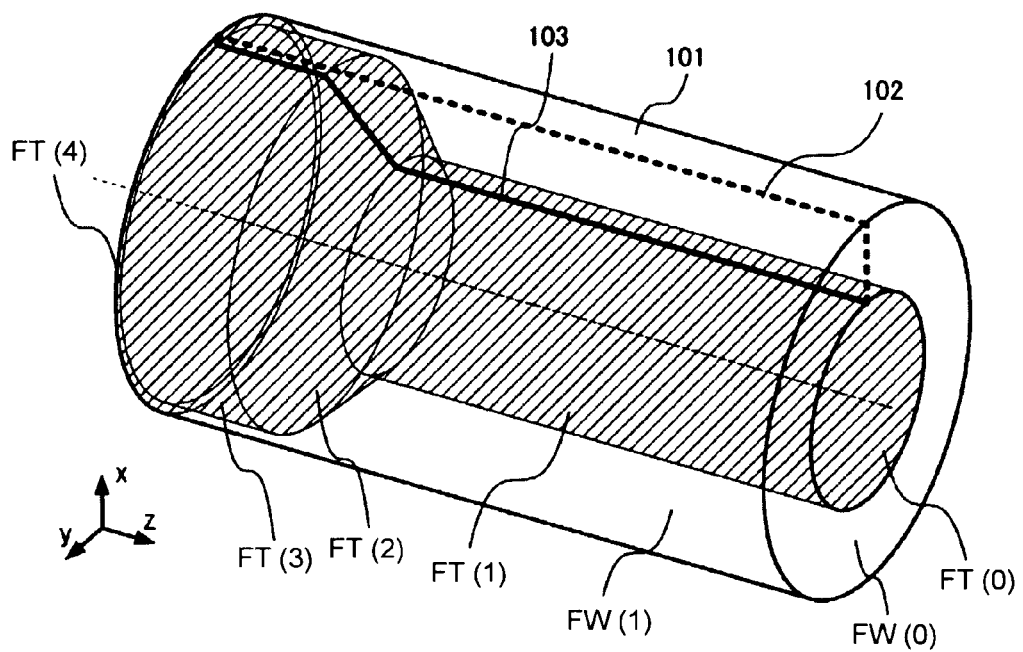
FIG. 5 is a detailed drawing of a machining region shape in the outer-diameter turning process according to the first embodiment of the present invention.

FIGS. 3 to 5 depict examples of the machining unit data for the machining other than the chamfering process. The machining unit data includes data concerning, for example, the machining region shape, the machining method, the tools to be used, and the machining conditions. FIG. 3 depicts an example of the machining unit data for an outer-circumference-shaving turning process (hereinafter, "outer-diameter turning process"). The machining unit data includes: closed contour shape data on the Z-X plane as the machining region shape data; data indicating the type of the machining (an outer-diameter turning process) and the machining procedures (rough machining to finishing machining) as the machining method data; data specifying the tools to be used in each of the machining procedures (the rough machining and the finishing machining) as the used tool data; and data indicating a main shaft rotation number and a feeding speed for each of the machining procedures as the machining conditions.

FIG. 4 is a perspective view depicting material shapes before and after the outer-diameter turning process. FIG. 4(*a*) depicts a material shape before the outer-diameter turning process is performed, whereas FIG. 4(*b*) depicts a material shape after the outer-diameter turning process is performed. FIG. 5 is a detailed drawing of a machining region shape in an outer-diameter turning process to form a post-machining material shape from the material shape depicted in FIG. 4.

When the machining method is the outer-diameter turning process, two types of contour shapes (i.e., a machining goal contour shape 103 and a machining region contour shape 102) on the Z-X plane correspond to the machining region shape defining data. The shape obtained by rotating the contour shapes around the rotation central axis of the turning process (i.e., the axis parallel to the Z-axis) is a machining region shape 101 in actuality. The boundary plane of the machining region shape 101 in actuality is made up of a plane (hereinafter, the "machining goal plane") indicating the position of the goal post-machining shape and the other plane (hereinafter, the "machining region plane"). These two planes are obtained as rotation planes of the machining goal contour shape 103 and the machining region contour shape 102 in the machining region shape data, respectively, and a number is appended to each of the planes. In FIG. 5, FT(i) (where i denotes a number) expresses the machining goal plane, whereas FW(j) (where j denotes a number) expresses the machining region plane.

Also, for the machining units using machining methods other than the outer-diameter turning process, the boundary of each of the machining region shapes in actuality is made up of a machining goal plane and a machining region plane to which numbers are appended. When the data of the machining units other than the machining units for the chamfering process has been input and stored in the machining program storage unit 3, the process returns to step S201.

At step S204, when the instruction indicates that the machining unit data for the chamfering process should be input, the process proceeds to step S206. The processes at steps S206 through S208 are steps performed for inputting/setting the machining unit for the chamfering process.

At step S206, the post-machining material shape generating unit 4 generates the post-machining material shape data, based on the material shape and the already-stored machining unit data that are stored in the machining program storage unit 3.

Figure 6:
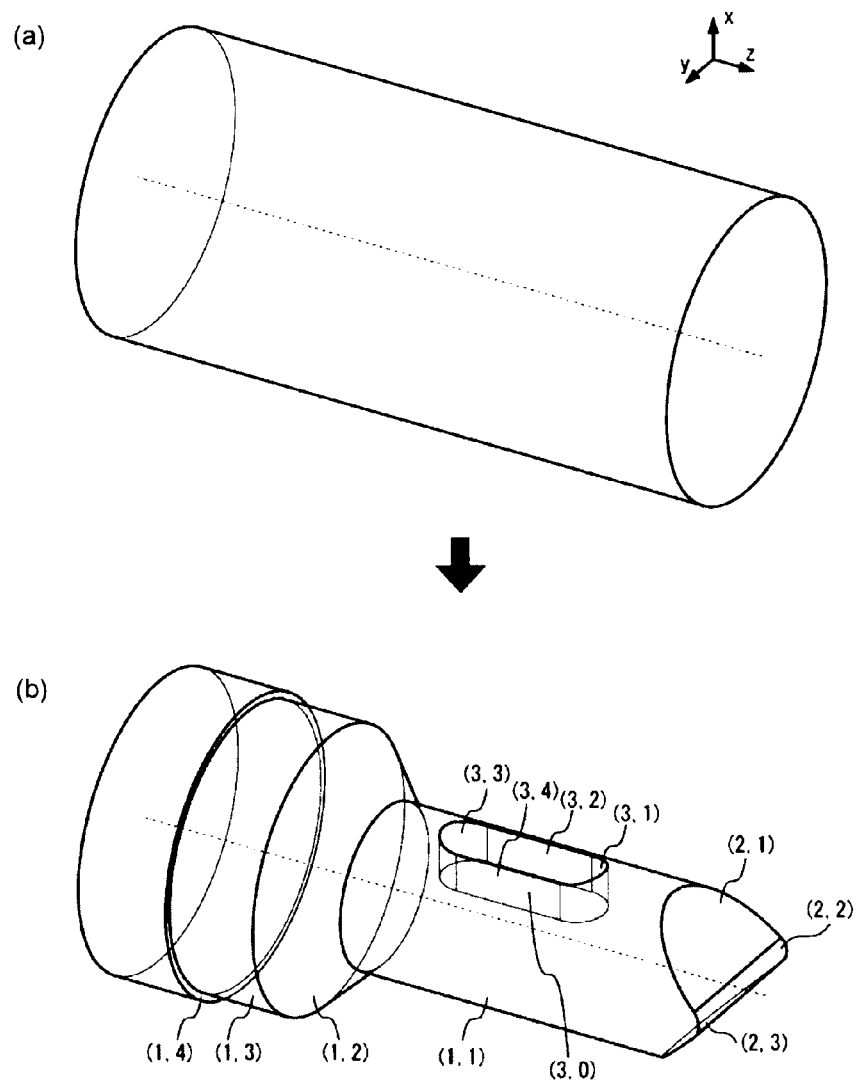
FIG. 6 is a perspective view depicting a material shape before and after machining according to the first embodiment of the present invention.

FIG. 6 is a perspective view depicting material shapes before and after the machining. FIG. 6(*a*) depicts a material shape before the outer-diameter turning process is performed, whereas FIG. 6(*b*) depicts a post-machining material shape formed by three machining units for an outer-diameter turning process, a pocket machining process, and a key groove machining process. The post-machining material shape is obtained by removing the machining region shapes respectively corresponding to the machining units, from the material shape. In FIG. 6(*b*), (i,j) expresses a machining unit and a machining plane, and i denotes a machining unit number, whereas j denotes a plane number of the machining goal plane. In the first embodiment, i=1 corresponds to the outer-diameter turning process, whereas i=2 corresponds to the pocket machining process, and i=3 corresponds to the key groove machining process.

FIG. 7 is a perspective view of a machining region shape respectively correspond to the three machining units. FIG. 7(*a*) depicts a material shape W and a machining region shape R0 for the outer-diameter turning process. FIG. 7(*b*) depicts a post-machining material shape W-R0 from which the machining region shape of the outer-diameter turning process is removed and a machining region shape R1 for the pocket machining process realized by, for example, end-face milling machining. FIG. 7(*c*) depicts a post-machining material shape W-R0-R1 from which the machining region shape of the pocket machining process is removed and a machining region shape for the key groove machining process realized by, for example, groove milling machining. Further, when the machining region shape of the key groove machining process is removed from the post-machining material shape, the post-machining material shape depicted in FIG. 6(*b*) is obtained. When a machining region shape is to be removed from a material shape or a post-machining material shape, a pair made up of a machining unit number i and a plane number j of the machining goal plane is appended, as attribute information, to the machining goal plane of the machining region shape transferred to the post-machining region shape after the removal.

At step S207, the relevant machining unit data extracting unit 5 extracts specific data used for specifying the machining region shape data of the machining unit relevant to the chamfering target part, based on the post-machining material shape data generated by the post-machining material shape generating unit 4 in the following manner: First, a graphic display of the post-machining material shape data is displayed on a screen, so that one edge of the chamfering target part in the post-machining material shape data is selected, according to an instruction from the operator using a pointing device or the like. In this situation, the candidates of edges to be selected from are the following two: an edge between machining goal planes belonging to mutually-different machining units transferred to the post-machining material shape; and an edge between a plane of the material shape and the machining goal plane. After that, attribute data annexed to the machining goal plane positioned adjacent to each selected edge is extracted as the specific data used for specifying the machining region shape data relevant to the chamfering target part.

FIGS. 8 to 10 depict examples of machining units for the chamfering process performed on selected edges. FIG. 8 is a perspective view of the edges selected as the chamfering target parts. In FIG. 8, the bold line indicates the edges. E(k) (k=0, 1, 2, 3) represents an edge number indicating an edge selected as a chamfering target part. Further, (i,j) expresses a machining unit and a machining plane, where i denotes a machining unit number, whereas j denotes a plane number of the machining goal plane. FIG. 9 depicts an example of the machining unit data for the chamfering process. The machining unit data includes, as the machining region shape data, chamfering target part shape reference data, a pattern of the chamfered shape, and parameters specifying the size and the angle of the chamfered shape. The chamfering target part shape reference data shown in FIG. 10 is data used for referencing the machining region shape data relevant to the machining target part. The table is structured by collecting the specific data of the extracted machining region shape data.

In the table showing the chamfering target part shape reference data, each of the edges in the chamfering target parts is expressed by a set made up of machining goal planes positioned adjacent to the edge. Further, each of the machining goal planes is expressed by a number indicating the machining unit and a number indicating the machining goal plane of the machining unit; however, position information of the edges in the chamfering target parts is not directly stored as data. Instead, the position information of the edges in the chamfering target parts is calculated at the stage when the control command data is generated. Thus, even if the position of the machining region shape data of the referenced machining unit is adjusted, it is possible to automatically reflect the result of the adjustment onto the control command data for the chamfering process. Consequently, it is possible to eliminate the trouble of adjusting the chamfering machining unit data.

At step S208, an input of the specific data of the machining region shape data extracted by the relevant machining unit data extracting unit 5 and the machining unit data of the other chamfering process is received, so that the machining unit data for the chamfering process is stored in the machining program storage unit 3. After the process at step S208 is performed, the process returns to step S201.

At step S209, it is checked to see whether the operator instructs that the program should be executed. If the operator instructs that the program should be executed, the process proceeds to step S211. On the contrary, if the operator does not instruct that the program should be executed, the process proceeds to step S210.

At steps S211 through S218, a loop process is structured so as to generate control command data by taking out each of the pieces of machining unit data stored in the machining program storage unit 3.

At step S212, the machining program analyzing unit 6 analyzes the contents of the machining unit data being the machining target, so as to prepare for a tool path data generating process.

At step S213, it is checked to see whether the machining unit data being the machining target is data for a chamfering process. If the machining unit data is data for a chamfering process, the process proceeds to step S215, and if not, the process proceeds to step S214.

At step S214, the tool path generating unit 7 generates a tool path for the machining units other than the machining units for the chamfering process. The generated tool path data is then forwarded to the control command generating unit 10.

At step S215, the machining region shape generating unit 8 extracts the shape data of the chamfering target part, based on the material shape data stored in the machining program storage unit 3 and the machining region shape data of the machining unit referenced by the machining unit data for the chamfering process, with respect to the machining unit data for the chamfering process, and forwards the extracted data to the chamfering tool path generating unit 9. Based on the chamfering target part shape reference data depicted in FIG. 10, the machining unit number and the plane number within the machining region shape data are referenced for each of the edges in the chamfering target parts, so that two pieces of plane data of the machining region shape are extracted for each of the edges.

At step S216, the chamfering tool path is generated, based on the data relevant to the edge in the chamfered part forwarded as a result of the process at step S215.

At step S217, the control command generating unit 10 receives the tool path data and the chamfering tool path, generates control command data for operating a machine tool, and outputs the generated control command data to the controlling unit of a numerical control device. If a chamfering tool path is generated at step S216, the control command data is generated based on the tool path data and the chamfering tool path.

At step S218, it is checked to see whether there is any machining unit that has not yet been machined. If there is, the process is looped between steps S211 and S218.

At step S210, it is checked to see whether the operator has instructed that the operation should be ended. If the operator has instructed that the operation should be ended, the program is ended, while if not, the process returns to step S201.

As described above, the material shape data input unit 1 receives the external input of the data defining the material shape of each of the machining units, so that the received data is stored in the machining program storage unit 3. The machining unit data input unit 2 receives the input of the other-machining-unit-reference-type machining unit data including the reference data referencing the machining region shape data of one or more other machining units on which the definition of the machining region shape of each of the machining units is based. The received data is stored in the machining program storage unit 3. Further, when the machining region shape generating unit 8 analyzes the machining unit information and generates the control command data, the machining region shape data of a corresponding machining unit is generated, with respect to the other-machining-unit-reference-type machining unit data, based on the stored material shape data and the machining region shape data of the machining unit referenced by the other-machining-unit-reference-type machining unit data. The shape data of the chamfering target part contains the shape data for the chamfering target part. For this reason, even if it is necessary to perform a chamfering process on an edge of a curved plane where the shape of the machining target part is a complicated curving shape (e.g., an edge of a hole or a groove formed on a circular cylinder surface), it is possible to define the machining units for the chamfering process by, for example, only having an arrangement where the machining region shape data of the machining unit on which the machining region shape is based is referenced. Thus, it is possible to easily define the machining units without the need to input complicated shape information. Consequently, because it is possible to define a machining unit for the chamfering process or the like for each of the machining target parts, it is possible to obtain numerical control information used for performing appropriate machining suitable for the complicated shapes of the machining target parts such as curving parts.

Figure 11:
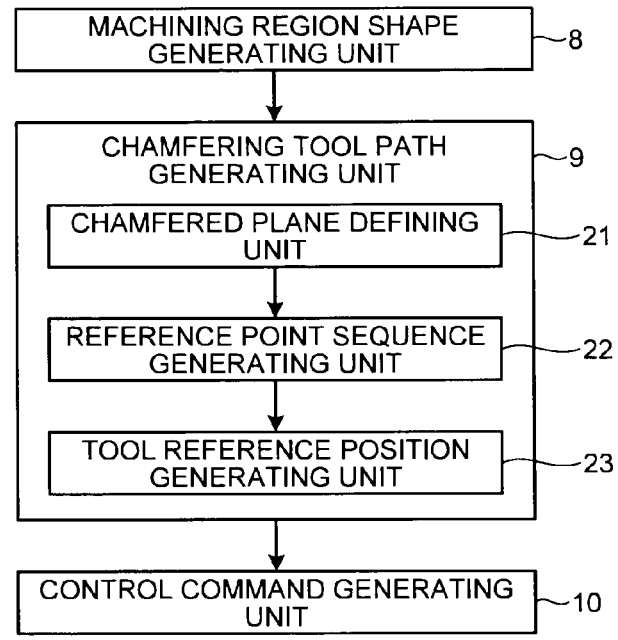
FIG. 11 is a block diagram of a chamfering tool path generating unit according to the first embodiment of the present invention.

FIG. 11 is a block diagram of a chamfering tool path generating unit according to the first embodiment of the present invention. The chamfering tool path generating unit 9 receives, from the machining region shape generating unit 8, an input of the machining region shape data of a part to which a chamfering process is to be applied. In the first embodiment, the process to generate the chamfering tool path, based on the data that is relevant to the edges in the chamfered part and is input from the machining region shape generating unit 8 will be explained in detail. The chamfering tool path generating unit 9 obtains chamfering data from a data storage unit storing therein the data related to the chamfering process and generates a chamfering tool path. According to the first embodiment, the machining region shape generating unit 8 corresponds to the data storage unit; however, depending on the contents of the obtained data, the storing function may also be distributed to the machining program storage unit 3. The chamfering tool path generating unit 9 obtains the data from the data storage unit, generates tool reference position data used for generating the tool path, and forwards the tool reference position data to the control command generating unit 10, which performs the ensuing processes.

In FIG. 11, the chamfering tool path generating unit 9 is configured to include a chamfered plane defining unit 21, a reference point sequence generating unit 22, and a tool reference position generating unit 23. For example, the chamfering tool path generating unit 9 is configured to control a machining operation performed by a machining center. With respect to an intersecting edge of machining planes extracted as a chamfering target part based on the data related to the chamfering process and a plane positioned adjacent thereto, the chamfered plane defining unit 21 defines a chamfered plane after the chamfering process is performed (hereinafter, the "chamfered plane") by using a chamfered shape pattern appended to the intersecting edge as an attribute. The reference point sequence generating unit 22 generates a sequence of points to be used as a reference when the chamfering tool path is generated based on the data related to the chamfering process. The tool reference position generating unit 23 calculates a reference position of a chamfering tool used when the tool passes while performing the chamfering process, based on the data related to the chamfering process and the reference points generated by the reference point sequence generating unit 22.

Figure 12:
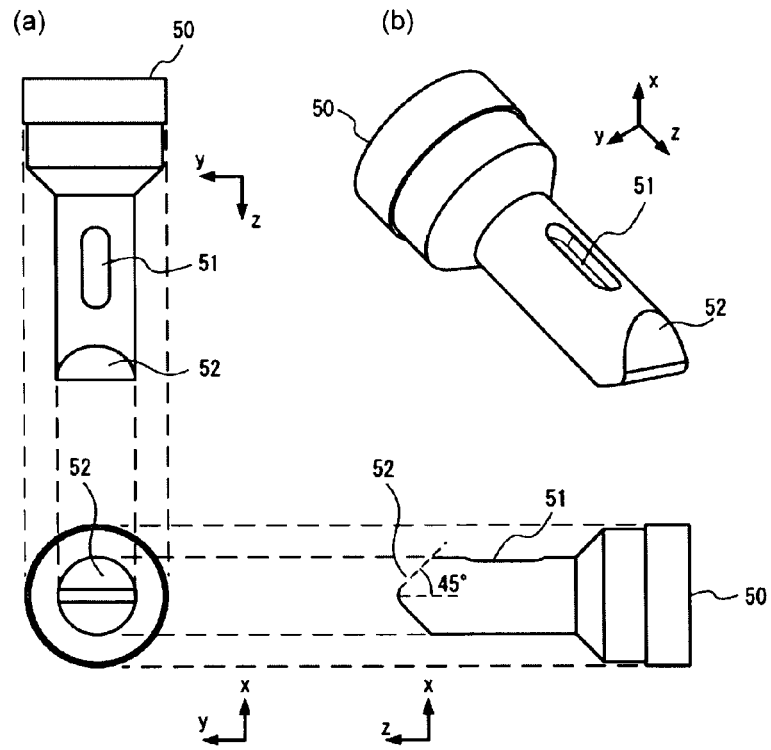
FIG. 12 is a drawing of an example of a material shape used for explaining a chamfering tool path generating process according to the first embodiment of the present invention.
Figure 13:
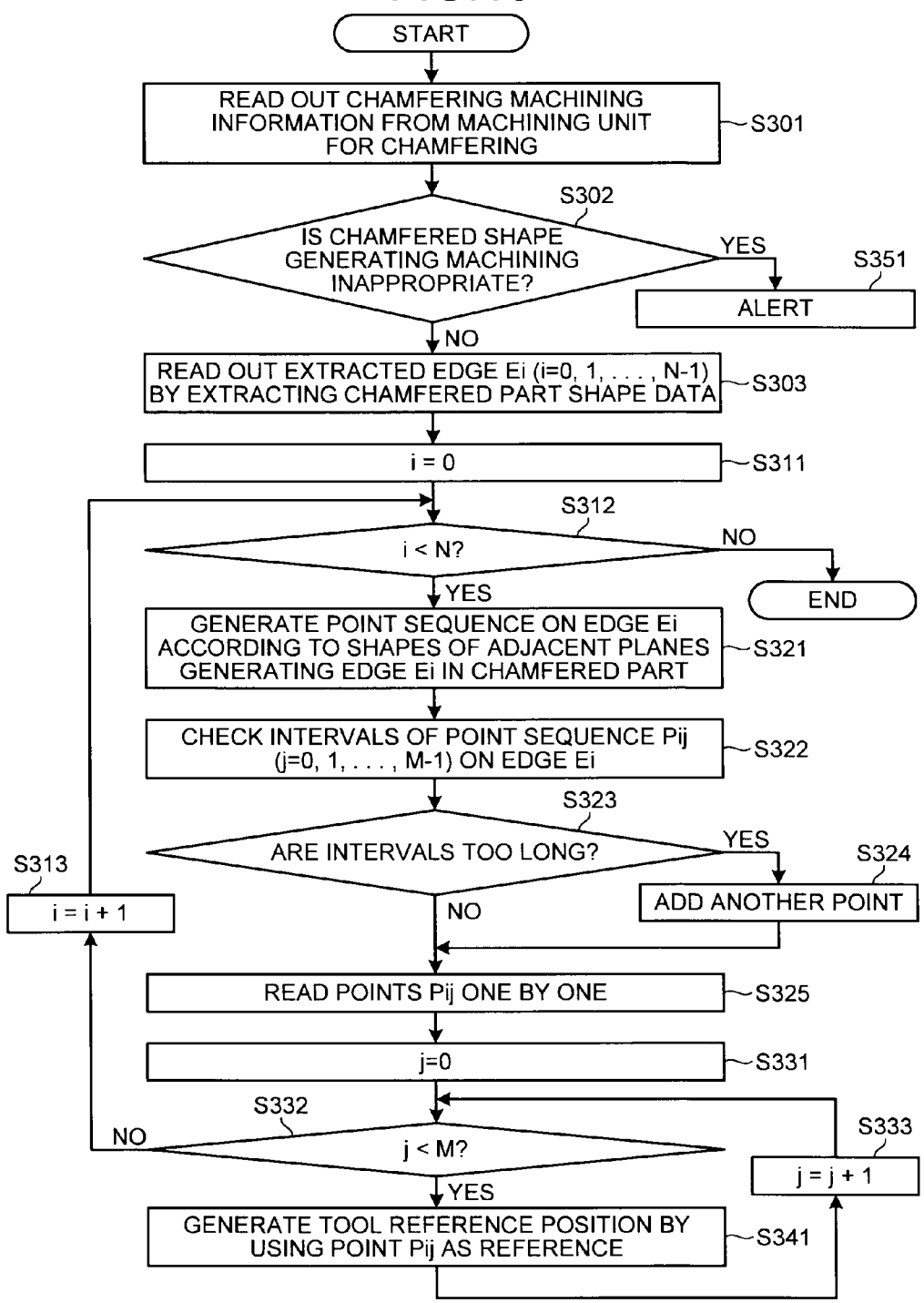
FIG. 13 is a flowchart of a process performed by a chamfering tool path generating unit according to the first of the present invention.

FIG. 12 depicts an example of a material shape used for explaining the chamfering tool path generating process. FIG. 12(b) is a perspective view, whereas FIG. 12(a) presents a three-direction view made up of a top view, a front view, and a side view. As for a post-machining material shape 50 shown in FIG. 12, chamfered parts 51 and 52 are the chamfered parts specified by the specific information of the chamfered part stored in the data storage unit 3. For example, the chamfered part 51 is obtained by performing a key groove machining process and is structured by an intersecting edge of the circular cylinder surface and the lateral face of the groove shape having a depth in the X-axis direction. The chamfered part 52 is obtained by performing a pocket machining process and is structured by an intersecting edge of the circular cylinder surface and the sloped plane at a 45-degree angle to the circular cylinder surface. In the first embodiment, the chamfering tool path generating process will be explained by using an example of the tool path generating process for the chamfered part 51. More specifically, the chamfering tool path generating unit 9 performs the process according to, for example, the flowchart shown in FIG. 13.

First, at step S301, machining information is read out from a machining unit for the chamfering process stored in the machining region shape generating unit 8. More specifically, the machining information is represented by information of the tools to be used in the chamfering process, shape information of the part to which the chamfering process is to be applied, machining conditions, a pattern of the chamfered shape, and parameters that are stored for each of the machining units.

At step S302, it is judged whether the post-chamfering chamfered plane shape defined based on, among the read machining information, the chamfered part shape data and the chamfered pattern is inappropriate. For example, it is impossible to apply machining having a chamfering amount of 0.5 millimeters to a part having a thickness of 0.5 millimeters. Thus, this process is judged to be inappropriate according to the first embodiment. If the chamfered shape generating process is judged to be inappropriate for the targeted shape part, the process exits from the chamfering tool path generating process corresponding to the read machining unit, so that an alert is displayed to the operator (step S351).

The chamfered shape pattern is one of the patterns that respectively express mutually-different chamfering process defining methods. FIG. 14 depicts an example of a shape pattern of a chamfered plane that is used in commonly-used machining drawings, with respect to a chamfered part for which the angle in the corner portion (hereinafter, the "corner angle") formed by the planes positioned adjacent to the intersecting edge is equal to α. In FIG. 14, the intersecting edge of the machining planes is indicated as ISE. FIG. 14(a) depicts shape patterns defined by "a" and θ, where "a" denotes the length (hereinafter, the "chamfering amount") of a side of the chamfered shape removed in the chamfering process, whereas θ denotes the angle (hereinafter, the "chamfering angle") formed by a plane positioned adjacent to the intersecting edge and the chamfered plane. Normally, it is often the case that the chamfering amount of the other side is also equal to "a". FIG. 14(b) depicts shape patterns defined by "a" and "b", where a denotes the chamfering amount defined for one of the adjacent planes positioned adjacent to the intersecting edge, whereas "b" denotes the chamfering amount defined for the other of the adjacent planes. Normally, it is often the case that b=a is satisfied. FIG. 14(c) uses an expressing method employed when the corner angle is 90 degrees while the chamfering amounts are equal between the adjacent planes of an intersecting edge. FIG. 14(c) depicts a shape pattern defined by c where c denotes the width of the chamfered plane (hereinafter, the "chamfering width").

If the chamfered shape generating process is not inappropriate, the process proceeds to step S303. At step S303, an edge $E_i$ ($i=0, 1, \ldots, N-1$) extracted in the chamfered part shape data extracting process corresponding to step S215 in the flowchart shown in FIG. 2 is read out. To sequentially perform a process on the read edge $E_i$, the value of i is set to 0 at step S311. After that, at step S312, it is judged whether i is smaller than N (i.e., the total number of edges). If i<N is satisfied, the process proceeds to step S321. If i<N is not satisfied, the chamfering tool path generating process ends, so that the process proceeds to step S217 in the flowchart shown in FIG. 2.

Subsequently, at step S321, a reference point sequence to be used as a reference for the tool path is calculated, with respect to the read edge $E_i$. There are a number of methods for calculating reference points with respect to an edge; however, in the first embodiment, if an edge is a straight line, the end points are used as the reference points, and if an edge is a curve, points obtained by dividing the edge into sections each approximating a straight line are used as the reference points. It should be noted, however, that if precision for a three-dimensional curved edge is sought, the calculation may be more complicated than necessary. Accordingly, with regard to the chamfering tool path generating process according to the first embodiment, an approximate value is calculated by using a simplified calculating method as explained below.

First, a targeted edge expressed in three dimensions is transferred onto a plane so that the transferred two-dimensional edge is divided into sections, and the points on the original three-dimensional edge respectively corresponding to the dividing points are used as the reference points. In this situation, depending on the dividing method being used, the intervals between the two-dimensional dividing points may be too long or too short. In those situations, the dividing points are corrected so that the intervals between the dividing points become appropriate. In the first embodiment, with respect to the edge $E_i$, a transferred edge obtained by using a plane determined according to the machining conditions as the transfer plane will be referred to as $E_i'$.

More specifically, data related to a control axis used in the machining is obtained, according to the data of the tools and the machining conditions obtained based on the machining unit read at step S301. Generally speaking, during a chamfering process, if a ball-end mill is used, it is possible to bring a tool into contact with a machining target part at an angle within a predetermined range, even with three-axis machining; however, if a flat-end mill or a chamfering cutter is used in the machining, it may be necessary to control the rotation axis, too. In the first embodiment also, it is preferable to use a flat-end mill or a chamfering cutter in consideration of the end result and efficiency. In that situation, because it is necessary to control the C-axis, which is the rotation axis around the Z-axis, with respect to a material shape being a circular cylinder shape, five-axis machining is performed.

In the first embodiment, the transfer plane is determined according to the shape characteristics of the chamfered part and the control axis used in the machining. More specifically, the intersecting edge of the plane having a circular cylinder shape and the plane structuring the lateral face of the groove shape is the chamfered part. Thus, because the chamfered part is structured by a straight line parallel to the Z-axis and a curve being the section appearing on the circular cylinder surface, an X-Y plane perpendicular to the Z-axis, which is the central axis of the circular cylinder shape, is used as the transfer plane. With this arrangement, the starting points and the ending points of the straight edges overlap each other in the same points, while the curved edge overlaps a part of an arc obtained by transferring the circular cylinder surface of the circular cylinder shape.

Figure 15:
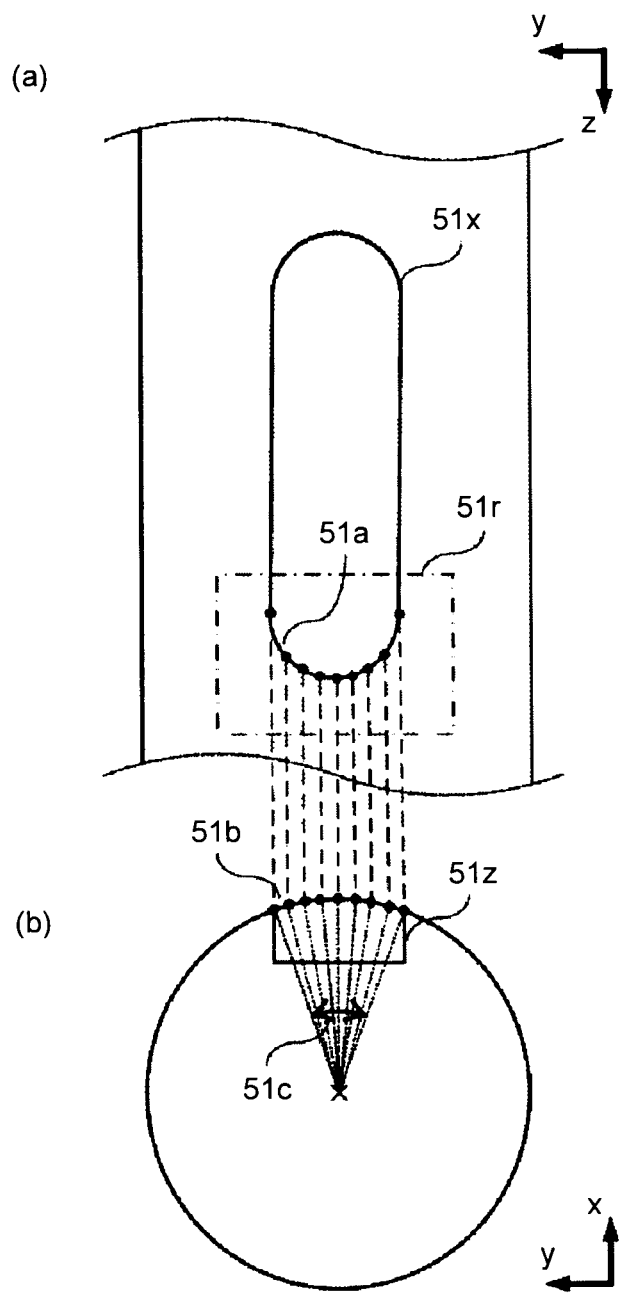
FIG. 15 is a drawing for explaining a process to generate reference points by dividing a transferred edge according to the first embodiment of the present invention.
Figure 16:
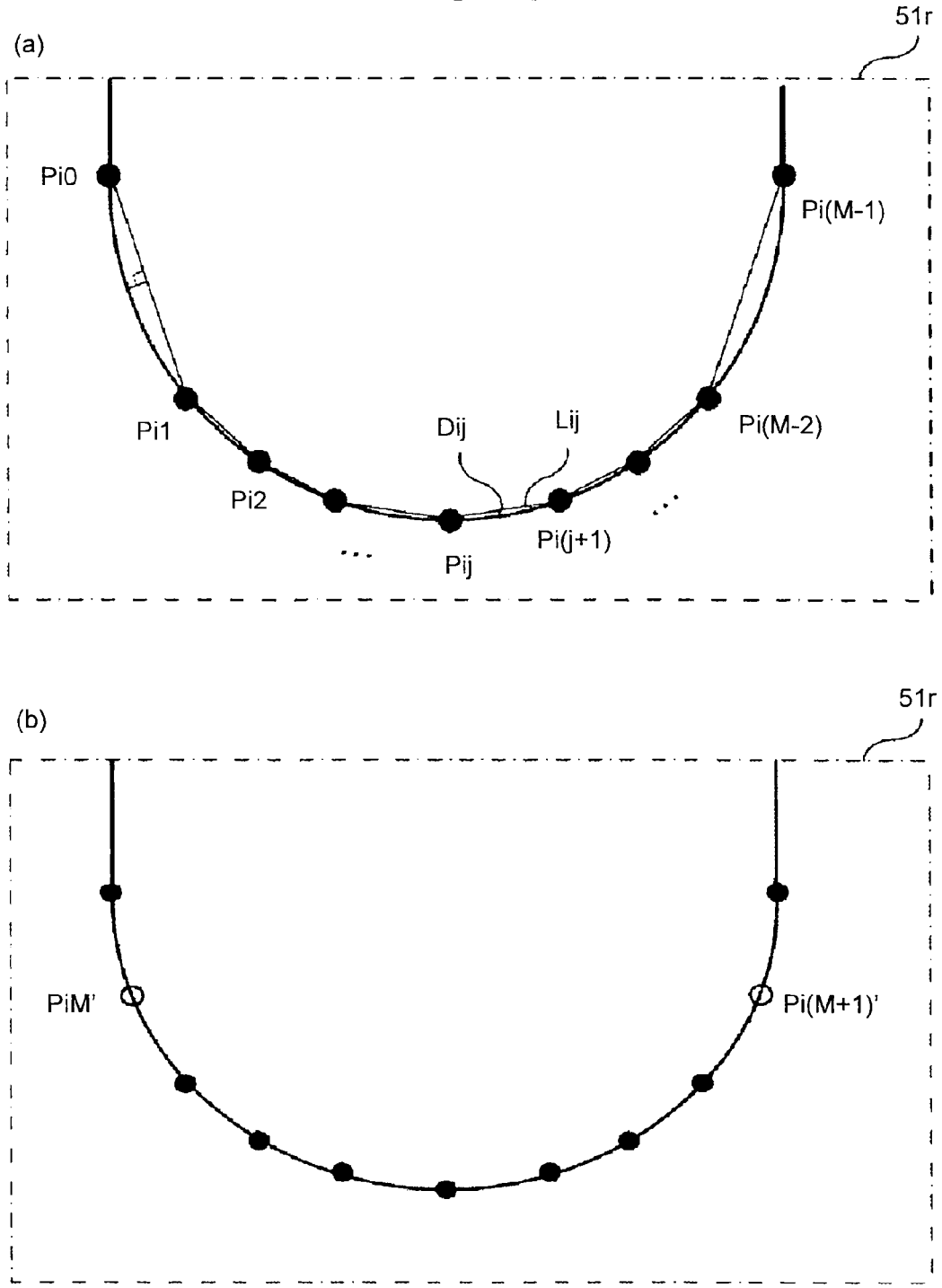
FIG. 16 is a partial enlarged drawing of the drawing for explaining the process to generate the reference points by dividing the transferred edge according to the first embodiment of the present invention.

Next, a specific example of the process to generate the reference points by dividing the transferred edge Ei' will be explained with reference to FIG. 15. FIG. 15 is an enlarged view of the surrounding of the region where the key groove machining process is applied to the material shape shown in FIG. 12. FIG. 15(a) is a view on a Y-Z plane, whereas FIG. 15(b) is a view obtained by transferring FIG. 15(a) onto an X-Y plane. The reference numeral 51x denotes the groove shape viewed on the Y-Z plane. The reference numeral 51a denotes an intersecting edge Ei, which is a curved edge among the constituent elements of the groove shape 51x. The reference numeral 51z denotes a transferred shadow shape of the groove shape indicated by the reference numeral 51x. The reference numeral 51b denotes a transferred edge Ei' of the intersecting edge Ei indicated by the reference numeral 51a. The reference numeral 51c denotes the center angle of the transferred edge Ei' that is the arc indicated by the reference numeral 51b. Further, the reference numeral 51r denotes an arc region of the groove shape 51x. FIG. 16 is a partial enlarged drawing of the arc region of the groove shape 51x.

Because the transferred edge Ei' indicated by the reference numeral 51b is an arc, the center angle is equally divided. It is possible to specify the equal division of the angle by using a dividing angle or the number of sections. In the first embodiment, the angle is equally divided into M sections. The obtained dividing points are present on the transfer plane, which is an X-Y plane. Thus, to reflect the dividing points onto the original intersecting edge Ei, the dividing points are transferred onto the intersecting edge Ei in a direction parallel to the Z-axis, so as to obtain new dividing points Pij (j=0, 1, . . . , M−1). As shown in FIG. 16(a), the dividing points on the X-Y plane are generated as being transferred onto the intersecting edge Ei, so that the dividing points Pij (j=0, 1, . . . , M−1) are set on the Y-Z plane.

Next, at step S323, it is judged whether the intervals between the obtained dividing points Pij are too long. If the intervals are too long, a correcting process is performed at step S324. To judge whether the intervals between the dividing points are too long, it is possible to use, for example, a predetermined tolerance value. An example of the judgment as to whether the intervals between the dividing points are too long will be explained by using a part of the intersecting edge Ei viewed on the Y-Z plane in FIG. 16(a). A straight line Lij connecting together two dividing points Pij and Pi(j+1) that are positioned adjacent to each other is obtained. The maximum distance between the straight line Lij and the arc Pij·Pi(j+1) will be referred to as Dij. In this situation, if the maximum distance Dij is equal to or longer than a predetermined tolerance value, the interval is judged to be "too long" so that the arc Pij·Pi(j+1) is divided into two, and a new dividing point is added at the dividing location. The process described above is repeatedly performed while including the newly-added dividing points, until the interval between any two adjacently-positioned dividing points is no longer judged to be "too long". With the example shown in FIG. 16, an arc Pi0·Pi1 and an arc Pi(M−2)·Pi(M−1) are divided again as shown in FIG. 16(b), so as to obtain the newly generated dividing points PiM' and Pi(M+1)'. The dividing points including these dividing points will be used as the reference points Pij (i=0, 1, . . . , N−1; j=0, 1, . . . ) for the intersecting edge Ei.

Next, a process to calculate the reference position for the chamfering tool to be used when the tool passes while performing a chamfering process will be explained.

At step S325, while using the obtained dividing points Pij as the reference points Pij, the reference points Pij are read out one by one.

To sequentially perform the process on the read out reference point Pij, j is set to 0 at step S331. At step S332, it is judged whether j is smaller than M (i.e., the total number of dividing points). If j<M is not satisfied, the process ends. On the contrary, if j<M is satisfied, the process proceeds to step S341.

At step S341, a calculating process is performed so as to generate a tool reference position Qij (i=0, 1, . . . , N−1; j=0, 1, . . . ) with respect to each of the reference points Pij (i=0, 1, . . . , N−1; j=0, 1, . . . ). First, to calculate the tool reference position Qij for each of the reference points Pij, a cross-sectional plane Fij is defined in the first embodiment. For example, the cross-sectional plane Fij can be defined as a plane that passes the reference point Pij and is perpendicular to a reference vector Vij, which is a directional vector of the reference point Pij on the intersecting edge Ei.

FIG. 17 is a drawing for explaining the cross-sectional plane defined in the first embodiment. FIG. 17(a) is a perspective view of the post-machining material shape 50. FIG. 17(b) depicts the surrounding of the groove-shaped chamfered part 51 viewed on a Y-Z plane. FIG. 17(c) depicts the surrounding of the groove-shaped chamfered part 51 viewed on an X-Z plane. Vij denotes the reference vector at the reference point Pij. Fij denotes the cross-sectional plane perpendicular to the reference vector Vij.

More specifically, as shown in FIG. 17, the reference vector Vij is calculated with respect to the reference point Pij obtained from the calculating process based on the intersecting edge Ei of the machining planes extracted as the chamfering target part, so that a plane perpendicular to the reference vector Vij is defined as the cross-sectional plane Fij. Next, a method for calculating the reference vector Vij will be explained. To calculate the reference vector Vij, normal vectors N1ij and N2ij are calculated respectively for a first machining plane and a second machining plane, which are the two planes positioned adjacent to the intersecting edge Ei. A vector perpendicular to these two normal vectors is defined as the reference vector Vij. More specifically, the reference vector Vij is calculated by calculating an outer product of the normal vectors N1ij and N2ij.

Figure 18:
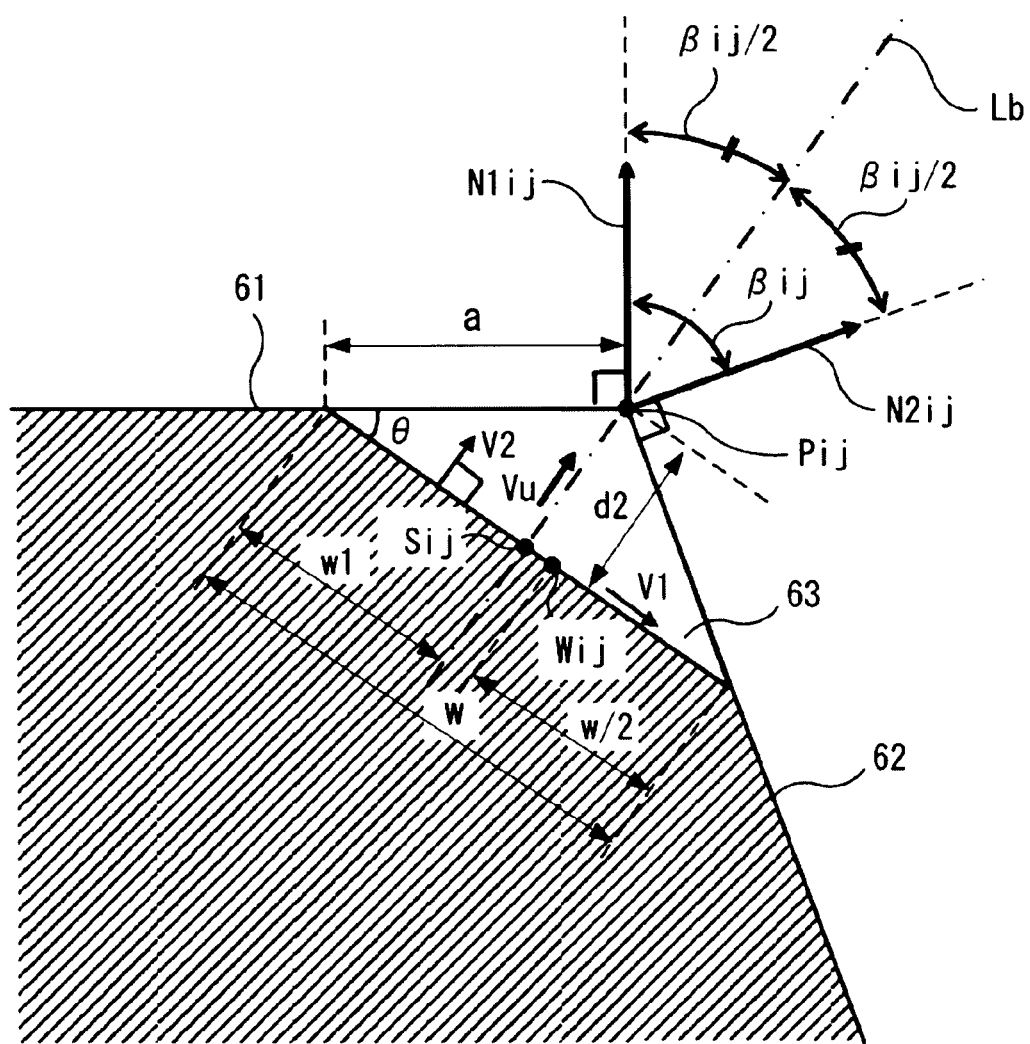
FIG. 18 is an enlarged view of the chamfering target part shown in FIG. 17.

Next, a process to generate tool reference position coordinates to be used as a reference for calculating the tool position during the chamfering process will be explained. FIG. 18 is an enlarged view of the chamfering target part of which a cross-sectional view is obtained by the cross-sectional plane Fij. In FIG. 18, the reference numeral 61 denotes the first machining plane, whereas the reference numeral 62 denotes the second machining plane. The reference numeral 63 denotes a chamfered shape to be removed by the chamfering process. First, with regard to the reference point Pij calculated in the manner described above, the tool reference position calculated according to the used tool data and the chamfered shape pattern is obtained on the cross-sectional plane Fij, while using an intersection point of a halving line Lb and the chamfered plane as a reference, the halving line Lb equally dividing, into two, an angle βij formed by the normal vector N1$ij$ of the first machining plane and the normal vector N2$ij$ of the second machining plane. When a unit vector parallel to the halving line Lb on the cross-sectional plane F$ij$ is expressed as Vu, it is possible to obtain the unit vector Vu by normalizing (N1$ij$+N2$ij$)/2.

Figure 19:
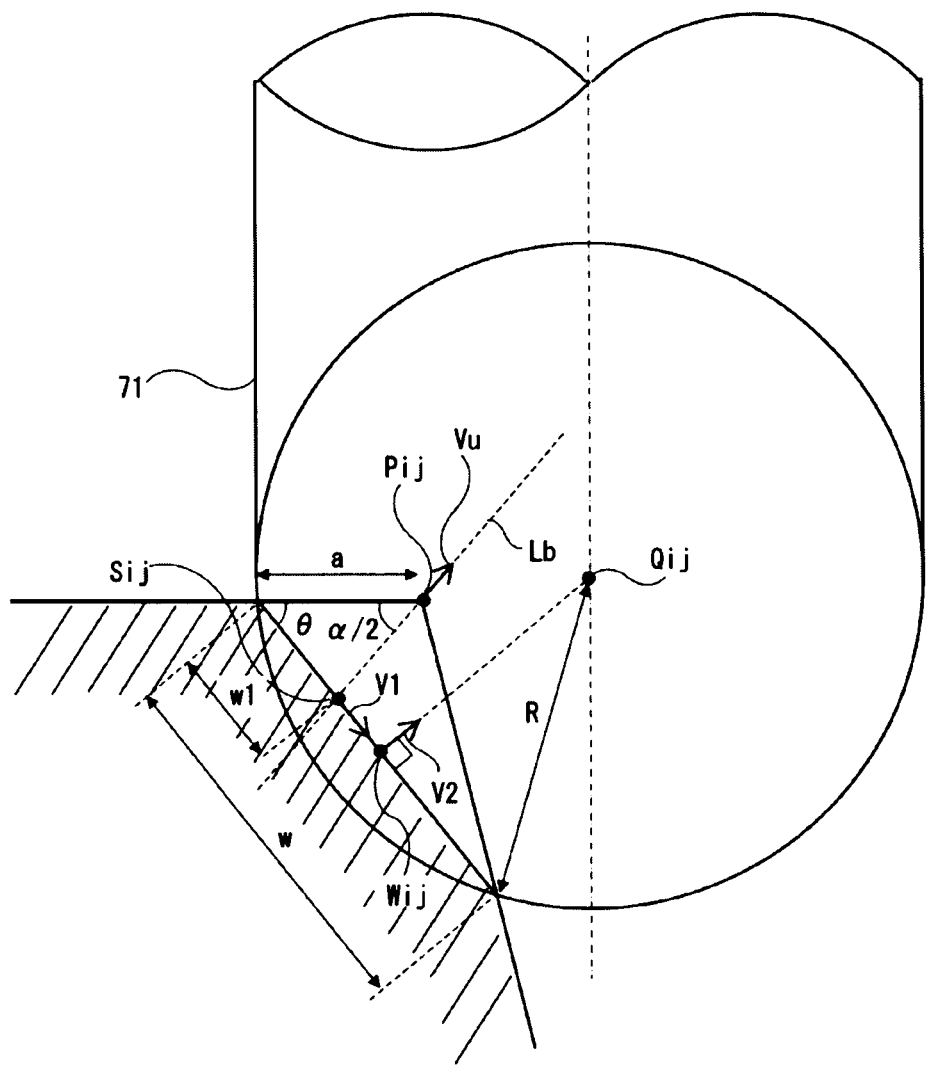
FIG. 19 is a drawing for explaining a process to calculate a distance between a reference point and a tool reference position when a ball-end mill is used according to the first embodiment of the present invention.
Figure 20:
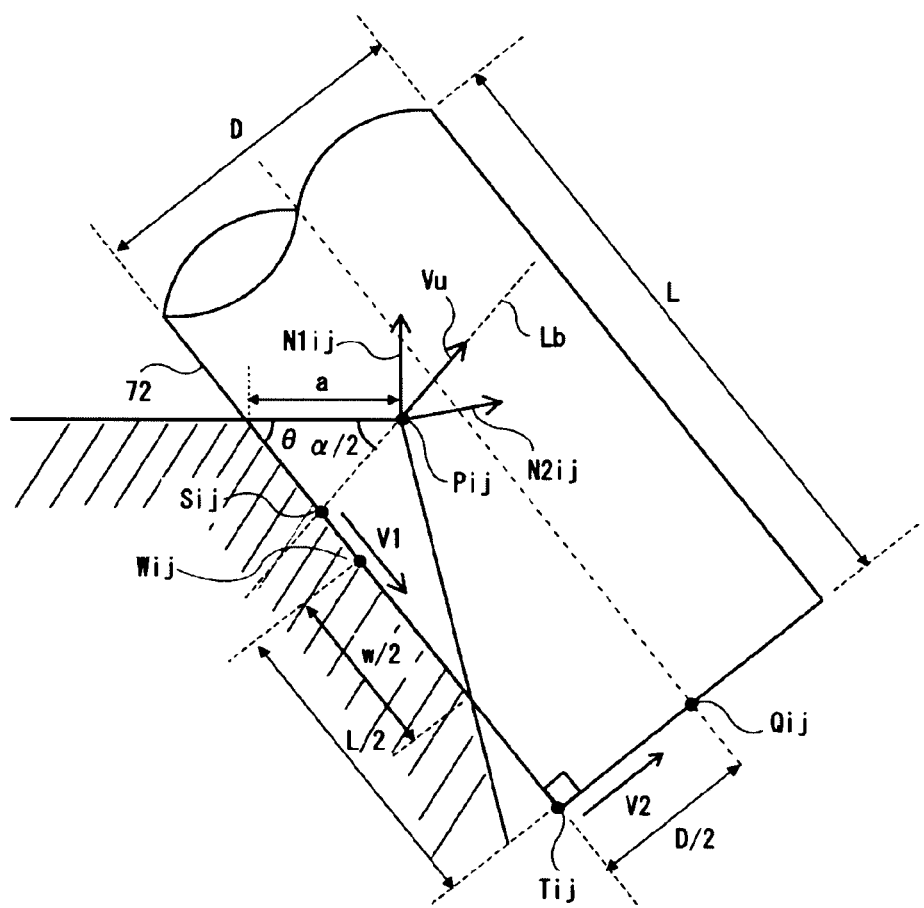
FIG. 20 is a drawing for explaining a process to calculate a distance between a reference point and a tool reference position when a flat-end mill is used according to the first embodiment of the present invention.
Figure 21:
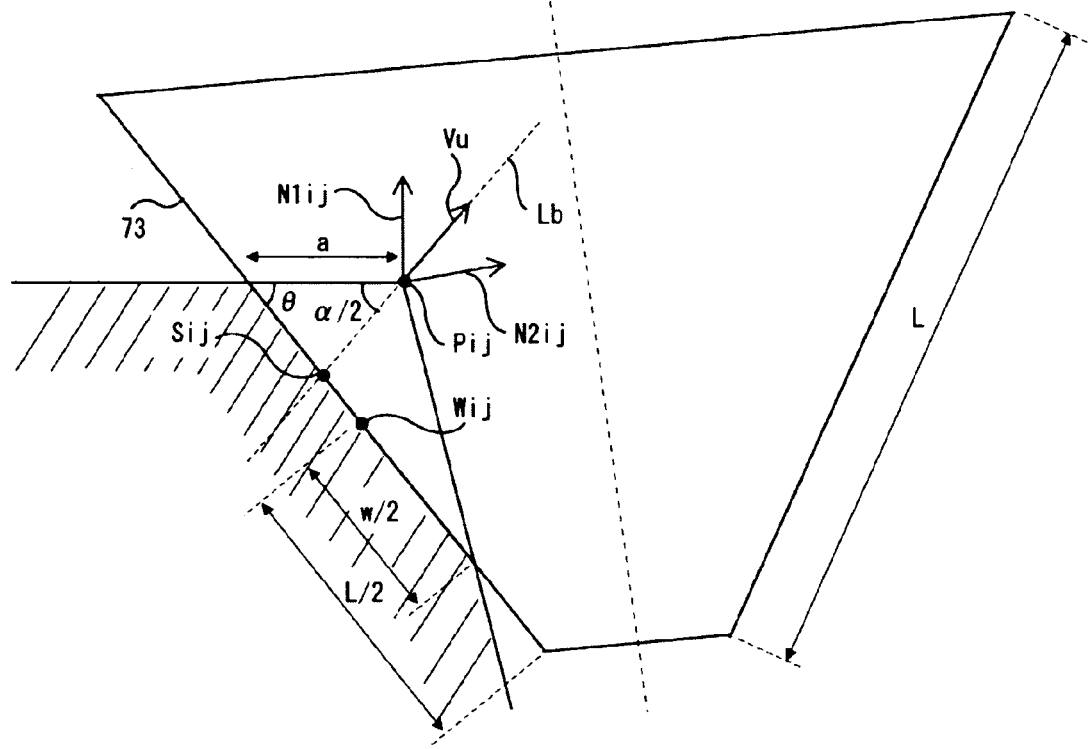
FIG. 21 is a drawing for explaining a process to calculate a distance between a reference point and a tool reference position when a chamfering cutter is used according to the first embodiment of the present invention.

Next, a method for calculating the tool reference position Q$ij$ based on a reference point P$ij$ will be explained. FIGS. 19 to 21 are drawings for explaining the process to calculate the tool reference position Q$ij$ based on a reference point P$ij$ and depict a cross section by the cross-sectional plane F$ij$ viewed from the positive direction of the reference vector V$ij$. FIG. 19 is a drawing for explaining a process to calculate the tool reference position Q$ij$ when a ball-end mill is used. FIG. 20 is a drawing for explaining a process to calculate the tool reference position Q$ij$ when a flat-end mill is used. FIG. 21 is a drawing for explaining a process to calculate the tool reference position Q$ij$ when a chamfering cutter is used.

The tool reference position Q$ij$ is used as a reference for generating a tool path to apply the machining of generating a chamfered plane defined by one of the chamfered shape patterns explained at step S302 with reference to FIG. 14, to the chamfered part. In the following sections, a method for calculating the tool reference position Q$ij$ will be explained. In the first embodiment, to accommodate various shapes of the tools to be used, the method for calculating the tool reference position will be defined for each of the different tools to be used. When a ball-end mill is to be used, the center of the ball in the tool will be used as the tool reference position. When a flat-end mill is to be used, the center of the bottom part of the tool will be used as the tool reference position. When a chamfering cutter is to be used, the middle position of the length of the blade in the tool will be used as the tool reference position. Further, the chamfering process explained in the first embodiment is to form the chamfered shape pattern shown in FIG. 14($a$) defined by the chamfering amount (a) and the chamfering angle ($\theta$), with respect to the chamfered part having the corner angle ($\alpha$).

In the first embodiment, an example in which the tool reference position Q$ij$ is calculated for the chamfered shape pattern shown in FIG. 14($a$) will be explained; however, the calculation method is also applicable for the patterns shown in FIGS. 14($b$) and 14($c$). More specifically, it is possible to apply the same method as the one used for FIG. 14($a$) to an example with the chamfered shape pattern shown in FIG. 14($b$), by using an assigned value as the chamfering amount a and replacing the chamfering angle $\theta$ with a value calculated by using Expression (1).

$$\theta=\tan^{-1}(b \cdot \sin \alpha/(a-b \cdot \cos \alpha)) \tag{1}$$

where $0<\theta<\pi/2$ and $0<\alpha<\pi$ are satisfied due to the characteristics of the chamfering process.

Further, it is possible to apply the same method as the one used for FIG. 14($a$) to an example with the chamfered shape pattern shown in FIG. 14($c$), by arranging the chamfering amount a shown in FIG. 14($a$) to satisfy a=c√2 and setting the chamfering angle $\theta$ shown in FIG. 14($a$) to 45 degrees.

Next, a method for calculating the tool reference position Q$ij$ based on the reference point P$ij$ will be explained for each of the different tools. When a ball-end mill 71 having a tool radius R as shown in FIG. 19 is to be used, the tool reference position Q$ij$ is the center of the ball in the tool. First, when the intersection point of the halving line Lb on the cross-sectional plane F$ij$ and the chamfered plane is expressed as S$ij$, the relationship among the distance d2 between the reference point P$ij$ and the point S$ij$, the chamfering amount a, the chamfering angle $\theta$, and the corner angle $\alpha$ can be expressed by using Expression (2) based on FIG. 18.

$$d2=(a \cdot \tan \theta \cdot (1+\tan^2(\alpha/2))^{1/2})/(\tan \theta+\tan(\alpha/2)) \tag{2}$$

Because the point S$ij$ is present on the chamfered plane, the point S$ij$ is positioned with respect to the reference point P$ij$ in the direction opposite to the unit vector Vu. Thus, the point S$ij$ can be expressed by using Expression (3).

$$Sij=Pij-d2 \cdot Vu \tag{3}$$

After that, when a unit vector from the point S$ij$ to an end point of the side other than the side indicating the chamfering amount a is expressed as V1, a point W$ij$ being the middle point of the chamfering width can be expressed by using Expression (4).

$$Wij=Sij+(w/2-w1) \cdot V1 \tag{4}$$

In Expression (4), (w/2−w1) expresses the distance between the point S$ij$ and the point W$ij$, when the chamfering width is expressed as w, while the distance from an end point of the side indicating the chamfering amount a to the point S$ij$ is expressed as w1. In this situation, w and w1 can be expressed by using Expressions (5) and (6), respectively.

$$w=a \cdot (1-2 \cdot \tan \theta/(\tan \alpha+\tan \theta)+(1+\tan^2\alpha) \cdot \tan^2\theta/(\tan \alpha+\tan \theta)^2)^{1/2} \tag{5}$$

(where, if $\alpha=\pi/2$ is true, w=a/cos $\theta$)

$$w1=a \cdot (1-2 \cdot \tan \theta/(\tan(\alpha/2)+\tan \theta)+(1+\tan^2(\alpha/2)) \cdot \tan^2\theta/(\tan(\alpha/2)+\tan \theta)^2)^{1/2} \tag{6}$$

Further, at the point S$ij$, the unit vector V1 corresponds to a vector obtained by rotating the unit vector Vu in the right-turn direction by an amount ($\theta+\alpha/2$), while using the reference vector V$ij$ corresponding to the normal vector on the cross-sectional plane F$ij$ as a rotation axis, and the unit vector V1 can be expressed by using Expression (7).

$$V1=Vu \cdot \cos(\theta+\alpha/2)+(1-\cos(\theta+\alpha/2)) \cdot (Vu,Vij) \cdot Vij-(Vij \times Vu) \cdot \sin(\theta+\alpha/2) \tag{7}$$

In the first embodiment, (Vu,V$ij$) refers to an inner product, whereas (V$ij$×Vu) refers to an outer product.

Further, based on Expression (7), it is possible to obtain a unit vector V2 expressed by using Expression (8).

$$V2=(Vij \times V1) \tag{8}$$

Accordingly, the tool reference position Q$ij$ for the ball-end mill can be expressed by using Expression (9), and it is possible to obtain a calculation result by assigning the expressions explained above thereto, as necessary.

$$Qij=Wij+(R^2-(w/2)^2)^{1/2} \cdot V2 \tag{9}$$

When a flat-end mill 72 of which the tool diameter is D and the blade length is L as shown in FIG. 20 is to be used, in the first embodiment, the tool reference position Q$ij$ is determined to be the center of the bottom part of the tool when the tool is positioned in such a manner that the center of the lateral face of the tool coincides with the center of the chamfering width. Of the circumferential part of the bottom part of the tool, when the point positioned closest to the point S$ij$ is expressed as T$ij$, the point T$ij$ can be expressed by using Expression (10).

$$Tij=Wij+(L/2) \cdot V1 \tag{10}$$

Accordingly, the tool reference position Q$ij$ for the flat-end mill 72 can be expressed by using Expression (11), and it is possible to obtain a calculation result by assigning the expressions explained above thereto, as necessary.

$$Qij=Tij+(D/2) \cdot V2 \tag{11}$$

Further, when a chamfering cutter 73 of which the blade length is L as shown in FIG. 21 is to be used, in the first embodiment, the tool reference position Qij is arranged to coincide with the center of the lateral face of the tool when the tool is positioned in such a manner that the center of the lateral face of the tool coincides with the center of the chamfering width, like in the example of the flat-end mill. In other words, because the tool reference position Qij coincides with the point Wij, the tool reference position Qij of the chamfering cutter 73 can be expressed based on Expression (4) by using Expression (12), and it is possible to obtain a calculation result by assigning the expressions explained above thereto, as necessary.

$$Qij=Sij+(w/2-w1)\cdot V1 \quad (12)$$

In the manner explained above, for each of the chamfering tools having the various shapes, it is possible to calculate the tool reference position Qij, which is the reference position of the chamfering tool that is used when the chamfering tool passes while performing the chamfering process. Instead of using the calculation methods explained above in the first embodiment, it is also acceptable to approximately calculate the tool reference position Qij by using the value of Sij in place of Wij. In that situation, because there is no need to perform the calculations with Expressions (4), (5), and (6), it is possible to reduce the load in the machining calculations. The tool reference position Qij calculated above is the point used as a reference for generating the tool path. Thus, when the tool reference position Qij is applied as it is, there may be some situations where a tool conflict occurs. Consequently, it is necessary to make adjustments when the tool path is generated.

When five-axis machining is performed, posture information of the tool during the machining is also required. It is possible to determine a tool posture by using, as a reference, the position at which the center of the tool is positioned parallel to the cross-sectional plane Fij defined in the first embodiment. With this arrangement, it is possible to reduce the processing amount in the process to calculate the chamfering tool path for the five-axis machining.

Figure 22:
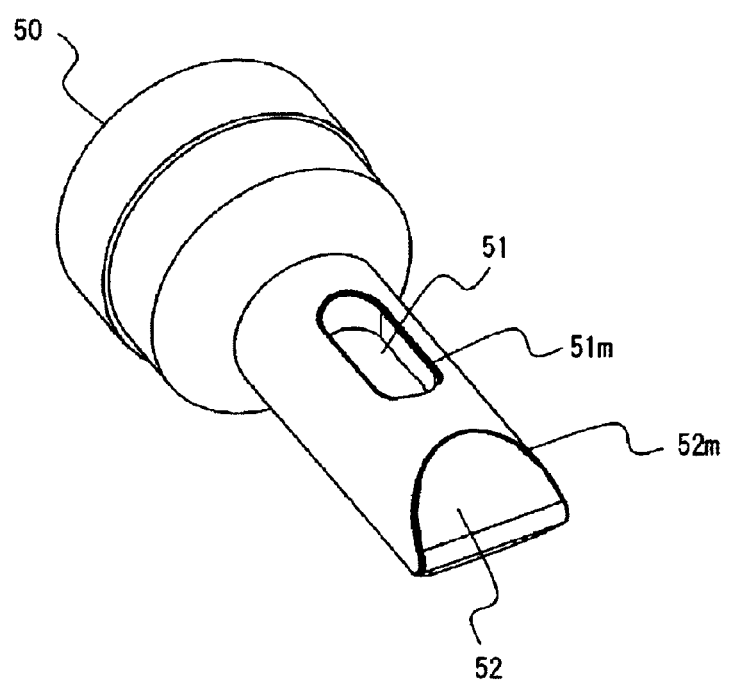
FIG. 22 is a perspective view of chamfered parts after a chamfering process is applied thereto according to the first embodiment of the present invention.

FIG. 22 is a perspective view of the chamfered parts 51 and 52 after the chamfering process using the method described above is applied thereto. In FIG. 22, regions 51m and 52m with the dark rims within the chamfered parts 51 and 52 are the regions to which the chamfering process has been applied.

After that, the process proceeds to step S217 in the flowchart shown in FIG. 2 so that the data of the tool path is received, the control command data for operating the machine tool is generated, and the generated control command data is output to the controlling unit of the numerical control device.

At step S218, it is checked to see whether there is any machining unit that has not yet been processed. If there is, the process is looped between steps S211 and S218.

At step S210, it is checked to see whether the operator has instructed that the operation should be ended. If the operator has instructed that the operation should be ended, the operation is ended. Otherwise, the process returns to step S201.

By performing the chamfering process using the method described above, it is possible to generate the tool path for the chamfering process with the simple operation, even if a CAD device or an NC device having special functions is not available. As a result, it is possible to shorten the operation period and improve the machining efficiency. Further, because it is possible to select a chamfered shape pattern and a tool according to the chamfered part, it is also possible to improve the machining efficiency by, for example, performing the chamfering process all at once with five-axis machining that uses a chamfering cutter or a flat-end mill. Consequently, it is possible to realize a chamfering process that meets the demand of the operator.

Second Embodiment

FIG. 23 is a drawing for explaining a cross-sectional plane defined in a second embodiment of the present invention. In the first embodiment, the chamfering tool path generating process is based on the assumption that five-axis machining is performed; however, it is also possible to approximately calculate a tool path by applying the method to three-axis machining. It should be noted, however, that the process related to the cross-sectional plane Fij is slightly different because the tool posture is fixed in the three-axis machining, unlike in the five-axis machining. The difference from the first embodiment will be explained below.

As shown in FIG. 23, the cross-sectional plane Fij in the three-axis machining is defined as a plane that passes the reference point Pij and is perpendicular to a transferred vector Vij' generated by transferring the reference vector Vij, which is a directional vector of the reference point Pij for the edge Ei, onto a plane perpendicular to the depth direction (i.e., the X direction) of the groove. More specifically, the reference vector Vij is calculated for each of the reference points Pij obtained by dividing the transferred edge Ei' from the intersecting edge Ei of the machining planes extracted as a chamfering target part, so that the plane perpendicular to the transferred vector Vij' generated by transferring the reference vector Vij onto the plane perpendicular to the depth direction of the groove is used as the cross-sectional plane Fij.

The reference vector Vij can be calculated by using the same method as the one explained in the first embodiment. Further, with reference to the drawing explaining the cross section by the cross-sectional plane Fij shown in FIG. 18 according to the first embodiment, the process should be performed by replacing the vector N1$ij$ with a vector transferred onto the cross-sectional plane Fij calculated by using the method described above with respect to the normal vector N1 of the first machining plane 61 and replacing the vector N2$ij$ with a vector transferred onto the cross-sectional plane Fij calculated by using the method described above with respect to the normal vector N2 of the second machining plane 62. The processes thereafter should also be performed in the same manner as in the first embodiment. As explained here, it is possible to approximately calculate the tool path by applying the method to the example with the three-axis machining.

REFERENCE SIGNS LIST

1 MATERIAL SHAPE DATA INPUT UNIT
2 MACHINING UNIT DATA INPUT UNIT
3 MACHINING PROGRAM STORAGE UNIT
4 POST-MACHINING MATERIAL SHAPE GENERATING UNIT
5 RELEVANT MACHINING UNIT DATA EXTRACTING UNIT
6 MACHINING PROGRAM ANALYZING UNIT
7 TOOL PATH GENERATING UNIT
8 MACHINING REGION SHAPE GENERATING UNIT
9 CHAMFERING TOOL PATH GENERATING UNIT
10 CONTROL COMMAND GENERATING UNIT

21 CHAMFERED PLANE DEFINING UNIT
22 REFERENCE POINT SEQUENCE GENERATING UNIT
23 TOOL REFERENCE POSITION GENERATING UNIT
50 POST-MACHINING MATERIAL SHAPE
51, 52 CHAMFERED PART
61 FIRST MACHINING PLANE
62 SECOND MACHINING PLANE
101 MACHINING REGION SHAPE
102 MACHINING REGION CONTOUR SHAPE
103 MACHINING GOAL CONTOUR SHAPE
Ei intersecting edge
Ei' transferred edge
Fij CROSS-SECTIONAL PLANE
N1ij, N2ij NORMAL VECTOR
Pij REFERENCE POINT
Qij TOOL REFERENCE POSITION
Vij REFERENCE VECTOR
Vij' transferred vector

The invention claimed is:

1. An automatic programming apparatus that generates control command data, based on machining unit data to apply partial machining to a material shape, comprising:
   a machining region shape generating unit that generates machining region shape data in the machining unit data; and
   a chamfering tool path generating unit that, while using the machining region shape data and chamfering data received from the machining region shape generating unit as shape data of a chamfering target part, generates tool path data used for performing a chamfering process, based on data including the shape data of the chamfering target part, used tool data that identifies which one of a ball-end mill, a flat-end mill, and a chamfering cutter is used to apply the partial machining, and machining condition data, wherein
   the chamfering tool path generating unit includes:
      a chamfered plane defining unit that generates shape data defining a chamfered plane obtained after the chamfering process is performed with respect to a shape of the chamfering target part, based on the machining region shape data and the machining condition data that are stored in advance;
      a reference point sequence generating unit that generates a reference point sequence used as a reference for generating the tool path data used for performing the chamfering process, based on the machining region shape data, the used tool data, and the machining condition data that are stored in advance; and
      a tool reference position generating unit that, with respect to each of reference points included in the reference point sequence and the chamfered plane generated by the chamfered plane defining unit, generates a location of a tool reference position of a chamfering tool used when the chamfering tool passes while performing the chamfering process, when the used tool data identifies the ball-end mill, the tool reference position is defined as a position at center of the ball in the ball-end mill, when the used tool data identifies the flat-end mill, the tool reference position is defined as a position at a center of a bottom part of the flat-end mill, and when the used tool data identifies the chamfering cutter, the tool reference position is defined as a position at a middle of a length of the blade in the chamfering cutter, and the tool reference position generating unit generates a cross-sectional plane based on the machining region shape data, with respect to each of the reference points generated by the reference point sequence generating unit, and determines the location of the tool reference position as a position that is present on a directional vector exactly halving an angle formed by two planes positioned adjacent to an intersecting edge of original machining planes on the cross-sectional plane and that is arranged along the directional vector at a distance from the reference point that is calculated based on the used tool data and the chamfered plane defined by the chamfered plane defining unit, wherein
   the chamfering tool path generating unit is configured to:
      read out machining information from the machining unit data for the chamfering process stored in the machining region shape generating unit;
      judge whether a post-chamfering chamfered plane shape defined based on, among the read machining information, chamfered part shape data and chamfered pattern is inappropriate; and
      exit, if judged to be inappropriate, from a chamfering tool path generating process corresponding to the read machining unit, so that an alert is displayed to an operator.

2. The automatic programming apparatus according to claim 1, wherein with respect to an intersecting edge of machining planes extracted as the chamfering target part and a plane positioned adjacent to the intersecting edge, the chamfered plane defining unit defines the chamfered plane obtained after the chamfering process is performed, by using a chamfered shape pattern appended to the intersecting edge as an attribute.

3. The automatic programming apparatus according to claim 1, wherein with respect to an intersecting edge of machining planes extracted as the chamfering target part, the reference point sequence generating unit transfers the intersecting edge onto a transfer plane generated based on the machining region shape data and the machining condition data that are stored in advance and uses dividing points to divide a transferred intersecting edge having been transferred into sections, as the reference point sequence for generating the tool path data used for performing the chamfering process.

4. An automatic programming method for generating control command data, based on machining unit data to apply partial machining to a material shape, comprising:
   generating machining region shape data in the machining unit data;
   generating tool path data used for performing a chamfering process, based on data including shape data and chamfering data of a chamfering target part, used tool data that identifies which one of a ball-end mill, a flat-end mill, and a chamfering cutter is used to apply the partial machining, and machining condition data by: generating, while using the machining region shape data as shape data of the chamfering target part, shape data defining a chamfered plane obtained after the chamfering process is performed with respect to a shape of the chamfering target part, based on the machining region shape data and the machining condition data that are stored in advance;
   generating a reference point sequence used as a reference for generating the tool path data used for performing the chamfering process, based on the machining region shape data, the used tool data, and the machining condition data that are stored in advance;

generating, with respect to each of reference points included in the reference point sequence and the chamfered plane generated by the chamfered plane defining unit, a location of a tool reference position of a chamfering tool used when the chamfering tool passes while performing the chamfering process, when the used tool data identifies the ball-end mill, the tool reference position is defined as a position at center of the ball in the ball-end mill, when the used tool data identifies the flat-end mill, the tool reference position is defined as a position at a center of a bottom part of the flat-end mill, and when the used tool data identifies the chamfering cutter, the tool reference position is defined as a position at a middle of a length of the blade in the chamfering cutter;

generating a cross-sectional plane based on the machining region shape data, with respect to each of the reference points in the reference point sequence;

determining the location of the tool reference position as a position that is present on a directional vector exactly halving an angle formed by two planes positioned adjacent to an intersecting edge of original machining planes on the cross-sectional plane and that is arranged along the directional vector at a calculated distance from the reference point, the calculated distance being calculated based on the used tool data and the chamfered plane defined by the chamfered plane defining unit;

reading out machining information from the machining unit data;

judging whether a post-chamfering chamfered plane shape defined based on, among the read machining information, chamfered part shape data and chamfered patter is inappropriate;

exiting, if judged to be inappropriate, from a chamfering tool path generating process corresponding to the read machining unit; and displaying alert to an operator.

* * * * *